US010237321B2

(12) United States Patent
Lotfallah et al.

(10) Patent No.: US 10,237,321 B2
(45) Date of Patent: Mar. 19, 2019

(54) DECODING COMPLEXITY FOR MOBILE MULTIMEDIA STREAMING

(71) Applicant: Vid Scale, Inc., Wilmington, DE (US)

(72) Inventors: Osama Lotfallah, San Diego, CA (US);
Eduardo Asbun, San Diego, CA (US);
Hang Liu, North Potomac, MD (US);
Yuriy Reznik, San Diego, CA (US)

(73) Assignee: VID SCALE, INC, Wilmington, DE (US)

( * ) Notice: Subject to any disclaimer, the term of this patent is extended or adjusted under 35 U.S.C. 154(b) by 228 days.

(21) Appl. No.: 14/435,434

(22) PCT Filed: Oct. 18, 2013

(86) PCT No.: PCT/US2013/065638
§ 371 (c)(1),
(2) Date: Apr. 13, 2015

(87) PCT Pub. No.: WO2014/063026
PCT Pub. Date: Apr. 24, 2014

(65) Prior Publication Data
US 2015/0237103 A1 Aug. 20, 2015

Related U.S. Application Data

(60) Provisional application No. 61/715,466, filed on Oct. 18, 2012.

(51) Int. Cl.
*H04L 29/06* (2006.01)
*H04W 52/02* (2009.01)

(52) U.S. Cl.
CPC .......... *H04L 65/607* (2013.01); *H04L 65/602* (2013.01); *H04W 52/0251* (2013.01)

(58) Field of Classification Search
CPC ....... H04N 7/16; H04L 65/607; H04L 65/602; H04W 52/0251
(Continued)

(56) References Cited

U.S. PATENT DOCUMENTS 6,470,378 B1 * 10/2002 Tracton ................... H04L 29/06
709/203
2010/0091714 A1 * 4/2010 Bennett ............. H04N 21/4126
370/328
(Continued)

FOREIGN PATENT DOCUMENTS

CN 101171843 A 4/2008
CN 101277448 A 10/2008
(Continued)

OTHER PUBLICATIONS

3rd Generation Partnership Project (3GPP), TS 25.331 V10.9.0, "Technical Specification Group Radio Access Network, Radio Resource Control (RRC), Protocol Specification (Release 10)", Sep. 2012, 1895 pages.
(Continued)

*Primary Examiner* — Hunter B Lonsberry
(74) *Attorney, Agent, or Firm* — Condo Roccia Koptiw LLP

(57) ABSTRACT

A decoding complexity may be used to predict power consumption for receiving, decoding, and/or displaying multimedia content at a wireless transmit/receive unit (WTRU). The decoding complexity may be based on decoding complexity feedback received from a reference device, such as another WTRU. The decoding complexity feedback may be based on measurements performed at the reference device for receiving decoding, and/or displaying the multimedia content. A content providing device may indicate the decoding complexity of requested media content to a WTRU, or another network entity. The decoding complexity (Continued)

may be indicated in a streaming protocol or file associated with the media content. The WTRU, or other network entity, may use the decoding complexity determine its preferences regarding transmission of the media content. The content providing device may determine whether to transmit the media content based on the decoding complexity and/or the preferences of the WTRU or other network entity.

20 Claims, 12 Drawing Sheets

(58) Field of Classification Search
USPC .......................................................... 725/62
See application file for complete search history.

(56) References Cited

U.S. PATENT DOCUMENTS

| | | | |
|---|---|---|---|
| 2010/0268836 A1* | 10/2010 | Jabri | H04L 47/38 709/231 |
| 2012/0209952 A1 | 8/2012 | Lotfallah et al. | |
| 2013/0042013 A1* | 2/2013 | Bouazizi | H04N 21/23439 709/228 |
| 2014/0109164 A1 | 4/2014 | Yamagishi | |
| 2014/0137168 A1* | 5/2014 | Takahashi | H04N 21/6125 725/90 |

FOREIGN PATENT DOCUMENTS

| | | | |
|---|---|---|---|
| CN | 102498739 A | 6/2012 | |
| JP | 2002-077377 A | 3/2002 | |
| JP | 2002-132622 A | 5/2002 | |
| JP | 2007-527660 A | 9/2007 | |
| JP | 2012-253642 A | 12/2012 | |
| JP | 2013-502181 A | 1/2013 | |
| WO | WO 2005/069108 A1 | 7/2005 | |
| WO | WO 2006/099082 A2 | 9/2006 | |
| WO | WO 2009/009166 * | 1/2009 | H04L 29/06 |
| WO | WO 2011/020060 A2 | 2/2011 | |

OTHER PUBLICATIONS

3rd Generation Partnership Project (3GPP), TS 26.244 V11.1.0, Technical Specification Group Services and System Aspects, Transparent End-To-End Packet Switched Streaming Service (PSS), 3GPP File Format (3GP) (Release 11), Sep. 2012, 60 pages.
3rd Generation Partnership Project (3GPP), TS 26.247 V10.2.0, Technical Specification Group Services and System Aspects, Transparent End-To-End Packet-Switched Streaming Service (PSS), Progressive Download and Dynamic Adaptive Streaming over HTTP (3GP-DASH) (Release 10), Jun. 2012, 110 pages.
3rd Generation Partnership Project (3GPP), TS 36.331 V10.6.0, "Technical Specification Group Radio Access Network, Evolved Universal Terrestrial Radio Access (E-UTRA), Radio Resource Control (RRC), Protocol specification (Release 10)", Jun. 2012, 302 pages.
Carroll et al., "An Analysis of Power Consumption in a Smartphone", NICTA and University of New South Wales, USENIX Annual Technical Conference, 2010, pp. 1-14.
Handley et al., "Session Description Protocol", Network Working Group, Request for Comments: 4566, Jul. 2006, 50 pages.
Li et al., "GreenTube: Power Optimization for Mobile Video Streaming via Dynamic Cache Management", Proceeding of ACM Multimedia, Nara, Japan, Oct. 29-Nov. 2, 2012, pp. 279-288.
Li et al., "Modeling Power Consumption for Video Decoding on Mobile Platform and Its Application to Power-Rate Constrained Streaming", Proceeding of IEEE VCIP, San Diego, CA, Nov. 2012, 6 pages.
Qian et al., "Characterizing Radio Resource Allocation for 3G Networks", IMC '10 Proceedings of the 10th ACM SIGCOMM conference on Internet Measurement, Melbourne, Australia, Nov. 1-3, 2010, pp. 137-150.
Trestian et al., "Energy Consumption Analysis of Video Streaming to Android Mobile Devices", IEEE Network Operations and Management Symposium (NOMS), Apr. 16-20, 2012, pp. 444-452.
Wenger et al., "Codec Control Messages in the RTP Audio-Visual Profile with Feedback (AVPF)", Network Working Group, Request for Comments: 5104, Feb. 2008, 65 pages.
ISO/IEC, "Information technology—Dynamic adaptive streaming over HTTP (DASH)—Part 1: Media presentation description and segment formats", ISO/IEC 23009-1:2012(E), ISO/IEC JTC 1/SC 29, Jan. 5, 2012, 133 pages.
ISO/IEC "Information technology—Dynamic adaptive streaming over HTTP (DASH)—Part 1: Media presentation description and segment formats, Technical Corrigendum 1", ISO/IEC 23009-1:2013/ Cor.1:2014(E), ISO/IEC JTC 1/SC 29/WG 11, Aug. 14, 2012, 13 pages.
Ericsson, "Understanding Smartphone Traffic Impact on Battery and Networks", Ericsson presentation DroidCon, Oct. 28, 2010, 23 pages.

* cited by examiner

DECODING COMPLEXITY FOR MOBILE MULTIMEDIA STREAMING

CROSS-REFERENCE TO RELATED APPLICATIONS

This application is the National Stage Entry under 35 U.S.C. § 371 of Patent Cooperation Treaty Application No. PCT/US2013/065683, filed Oct. 18, 2013, which claims the benefit of U.S. Provisional Patent Application No. 61/715,466, filed on Oct. 18, 2012, the contents of which are hereby incorporated by reference in their entirety.

BACKGROUND

Multimedia content may be sent from a content provider to a mobile device using a wireless communications network. The content may be provided by streaming the content such that the content may be received at the mobile device and/or provided to an end user of the mobile device. Mobile multimedia streaming may allow the mobile device to begin playback of the media content before the entire media file has been received at the device.

Streaming the multimedia content to a mobile device may be challenging due to the variability of the available bandwidth and the potential demand on the battery during the period of the multimedia experience. Due to the variability of the available bandwidth on the wireless communication network, the power consumed by the radio interface of the mobile device for receiving the multimedia content may be unknown or difficult to determine. Once the multimedia content is received at the mobile device, the decoding and playback of the content may consume additional power that may also be unknown or difficult to determine.

Due to the difficulty in determining the power consumed by the mobile device during the multimedia experience, unnecessary resources are being used by the mobile device and the network to transmit and/or display media data.

SUMMARY

Systems, methods, and apparatuses are described herein for predicting power consumption for receiving, decoding, and/or displaying multimedia content at a wireless transmit/receive unit (WTRU). A WTRU may request multimedia content from a content providing device. The content providing device may receive the request for the multimedia content and may determine a decoding complexity associated with the multimedia content. The decoding complexity may be based on data that indicates an amount of power used to receive, decode, and/or display the multimedia content at reference devices, such as WTRUs. For example, the decoding complexity may indicate a minimum decoding complexity value, a maximum decoding complexity value, and/or an average decoding complexity value for receiving, decoding, and/or displaying multimedia content at reference devices.

The multimedia content may include video content (e.g., video streams, video files, etc.), images, audio content, and/or other forms of multimedia content. The multimedia content may be comprised of different types of content. For example, where the media content includes video content the media content may include a standard version and a high definition version of the media content. The multimedia content may be segmented. Each of the different types and/or segments of media content may have a corresponding decoding complexity.

The content providing device may send an indication of the decoding complexity to the WTRU or other network device. The indication of the decoding complexity may be included in a media file or protocol. The WTRU, or another network device, may use the decoding complexity to determine whether to receive the requested media content. For example, the WTRU may compare the decoding complexity with the amount of available power resources available at the WTRU. Where multiple types or segments of content are included in the requested multimedia content, the WTRU, or other network device, may use the decoding complexity to select one or more types or segments of content.

The content providing device may also, or alternatively, determine whether to provide the requested media content, or one or more types or segments thereof, based on the associated decoding complexity. The content providing device may know various WTRU device characteristics and may use them to determine whether to provide the requested media content, or one or more types or segments thereof. The WTRU device characteristics may include the WTRU type, available power of the WTRU, and/or the power consumption configurations of the WTRU.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

Figure 1:
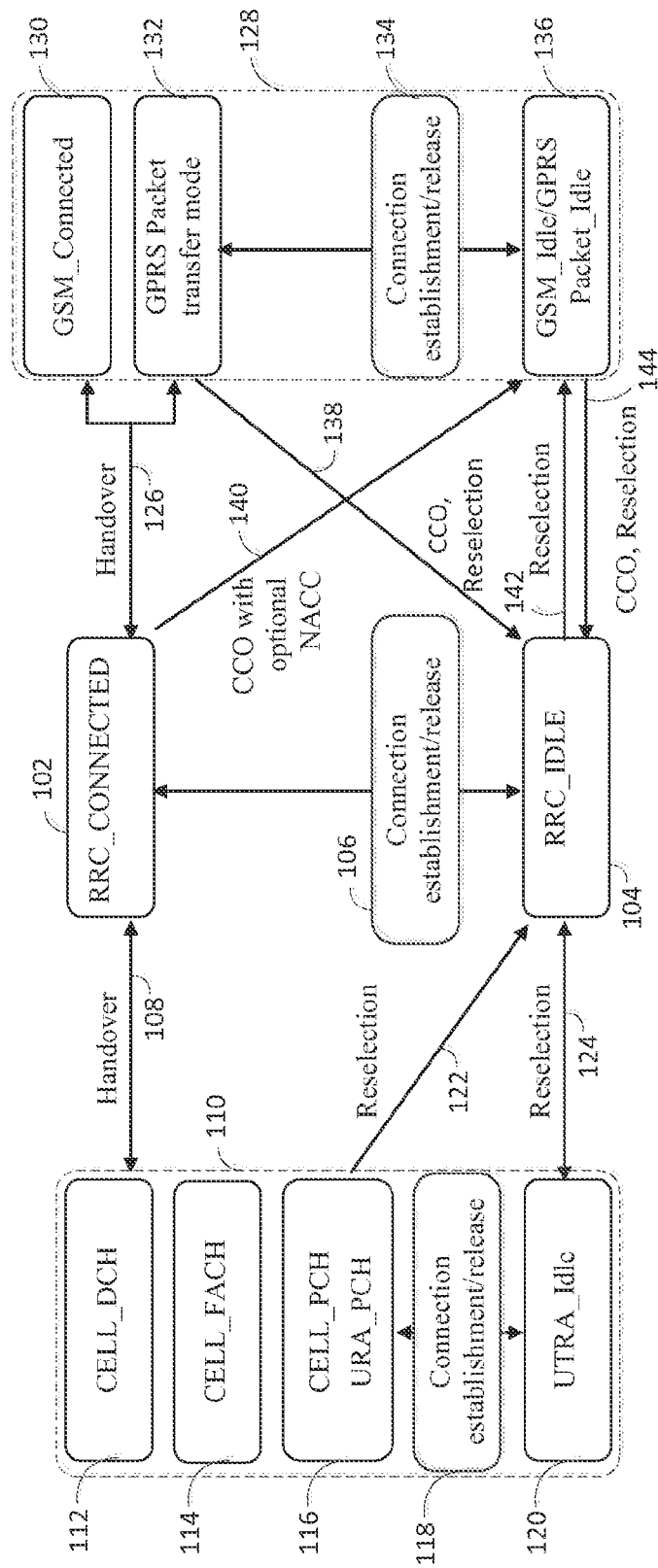
FIG. 1 is a diagram that depicts example communication states that may be used by a wireless transmit/receive unit (WTRU) in a wireless communication system.

A content provider may provide multimedia content to wireless transmit/receive units (WTRUs) over a wireless communication network. The amount of power consumed by a WTRU during a multimedia experience may be predicted based on the type of multimedia content and/or the WTRU characteristics. Measurements may be taken by WTRUs that have received, decoded, and/or displayed the multimedia content. These measurements may be used to predict the amount of power that may be consumed when receiving, decoding, and/or displaying the multimedia content.

A power consumption descriptor may be used to indicate the amount of power consumed by the WTRU during the multimedia experience. For example, the power consumption descriptor may indicate the amount of power consumed by the WTRU when receiving, decoding, and/or displaying the multimedia content. The power consumption descriptor may be referred to as a decoding complexity. The power consumption descriptor may be included in protocols, file formats, and/or the like. The power consumption descriptor may be based on a media stream or streams and/or a WTRU type or types.

Power consumption at a WTRU may be affected by streaming multimedia content in a communications system. The multimedia content may include video streams, images, audio, and/or other forms of multimedia data transmitted using the communication system. A video stream may be coded into various sub-streams by varying the video resolution, frame rate, and/or quantization parameter. The sub-streams may include H.264 streams, for example. Audio streams may also be coded into various sub-streams by a varying number of channels (e.g., 5.1, 2.0-stereo, 1.0-mono, etc.), different codecs, and/or codec extensions (e.g., MP3, advanced audio coding (AAC), high efficiency (HE)-AAC, etc.).

Power may be consumed at the WTRU for multimedia data processing and/or display. The power consumed by the wireless interface may account for a portion (e.g., about 15% to 25%) of the overall power consumption. The wireless interface may be the wireless module capable of receiving a signal and/or decoding the signal into digital data that may be passed to a multimedia decoding module. The wireless interface may communicate via Wi-Fi, 3G, 4G, and/or the like. The display of the WTRU may account for a portion of the aggregate power consumed for video playback. The display may account for the largest portion (e.g., between about 38% and 68%) of power consumed by components within the WTRU. The processor may account for a portion of the power consumed for video playback. The processor may account for the largest portion of power consumption for video playback after the display.

A call module may account for additional power that may be consumed for phone calls. The call module may be a GSM module or other module that may be used for processing call data. The power consumed by the call module may be static or dynamic.

Multimedia content may be pre-fetched or may be streamed for display at the WTRU. The multimedia content may be pre-fetched at a WTRU when the content is fully received at the WTRU before the WTRU may begin displaying a portion of the content. The multimedia content may be streamed by being sent to the WTRU in segments that may be displayed at the WTRU before the multimedia content is fully received. By streaming the multimedia content, a portion of the content may be viewed prior to receiving the entirety of the multimedia content. Multimedia content may be transmitted in segments using adaptive hypertext transfer protocol (HTTP) streaming. The periods between segments may be long enough for the air interface module to go to a sleep mode or idle mode in between transmissions.

FIG. 1 is a diagram that depicts example communication states that may be used by a WTRU in a wireless communication system. The communication states may include connected states for transmitting and/or receiving transmissions at a WTRU and/or idle states that may be used between transmissions. The power consumed by the WTRU may depend on transition between the communication states. For example, the WTRU may save power by transitioning from a connected state to a power saving connected state and/or an idle state, as shown in FIG. 1.

The example communication states may include radio resource control (RRC) states, such as the RRC connected state 102 and/or the RRC idle state 104. When Evolved Universal Mobile Telecommunications System (UMTS) Terrestrial Radio Access (E-UTRA) is implemented as a radio technology, such as in a long term evolution (LTE) communication system for example, the RRC connected state 102 may be an E-UTRA RRC connected state and/or the RRC idle state 104 may be an E-UTRA RRC idle state. The RRC connected state 102 may be used to transfer data (e.g., unicast data) to and/or from a WTRU. The RRC connected state 102 may be used, for network controlled mobility, to monitor control channels associated with shared data channels, and/or the like. The RRC idle state 104 may be used to monitor a paging channel to detect incoming calls, acquire system information, and/or perform logging of available measurements. The RRC connected state 102 may use a higher power level than the RRC idle state 104.

The WTRU may transition between the RRC connected state 102 and the RRC idle state 104 at 106. For example, the WTRU may transition from the RRC connected state 102 to the RRC idle state 104 after a period of time has elapsed without receiving transmissions in the RRC connected state 102. The WTRU may transition to the RRC idle state 104 to preserve battery power, as the RRC idle state 104 may use less power resources than the RRC connected state 102. The WTRU may transition to the RRC connected state 102, for example, when data transmissions are received for being processed in the RRC connected state 102. When the WTRU transitions between the RRC connected state 102 and the RRC idle state 104 at 106, the WTRU may establish a connection in the RRC connected state 102 and/or release the resources used for the RRC connected state 102 when the WTRU transitions to the idle state 104.

The RRC connected state 102 may be subdivided into a continuous reception state, a short discontinuous reception (DRX) state, a long DRX state, and/or the like. The short DRX state and/or the long DRX state may be power saving connected states that may use less power than the continuous reception state. A WTRU may transition to the continuous reception state, for example, when the WTRU is promoted from the RRC idle state 104. The continuous reception state may be used by the WTRU to transmit and/or receive data in the communication system. The WTRU may transition from the continuous reception state to a DRX state when it is waiting for data in the RRC connected state 102. For example, the communication device may transition from the continuous reception state to the short DRX state. The communication device may transition from the short DRX state to the long DRX state after a period of time has elapsed without receiving data in the RRC connected state 102. The long DRX state may be an extended DRX state that may allow the WTRU to be in a DRX mode for a longer period of time prior to transitioning into idle mode.

The transition between states may be handled using inactivity timers. The WTRU may transition from the continuous reception state to the short DRX state upon expiration of an inactivity timer T1. The inactivity timer T1 may begin when the WTRU is no longer transmitting and/or receiving data. The WTRU may transition from the short DRX state to the long DRX state upon expiration of an inactivity timer T2. The WTRU may transition from the long DRX state to the RRC idle state 104 upon expiration of an inactivity timer T3.

A WTRU may transfer states for connectivity to other radio technologies. The WTRU may transfer states for connectivity to a UMTS, global system for mobile communications (GSM), or other radio technologies for example. At 108, the WTRU may perform a handover between the RRC connected state 102 and a UMTS connected state. At 126, the WTRU may perform a handover between the RRC connected state 102 and a GSM/general packet radio service (GPRS) packet connected state.

The UMTS states 110 may include connected states and/or idle states. The connected states may include a CELL dedicated channel (DCH) state 112, a CELL forward access channel (FACH) state 114, and/or a CELL paging channel (PCH)/URA PCH 116. In the CELL_DCH state 112, the WTRU may be allocated dedicated transport channels in the downlink and/or the uplink direction. In the CELL_FACH state 114, the WTRU may transmit user data through shared channels with other WTRUs. The shared channels may be low-speed channels, which may be less than 15 kbps for example. In the CELL_PCH/URA_PCH state 116, the WTRU may remain in connected mode for paging and/or may transfer to FACH. The CELL_FACH state 114 and/or the CELL_PCH/URA_PCH state 116 may be a power saving connected state in UMTS, as they may use less power resources than the CELL_DCH state 112. The UMTS idle states may include a UTRA idle state 120. The WTRU may transition between a UMTS connected states 112, 114, 116 and the UTRA idle state 120 at 118. At 118, the WTRU may establish a connection with one state and/or release the resources for the other state.

The WTRU may perform reselection between a UMTS state 110 to an RRC state. For example, the WTRU may perform reselection from a UMTS connected state 112, 114, 116 to the RRC idle state 104 at 122. At 124, the WTRU may perform reselection between the UTRA idle state 120 and the RRC idle state 104.

The GSM/GPRS packet states 128 may include connected states and/or idle states. The connected states may include a GSM connected state 130 and/or a GPRS packet transfer mode state 132. In the GSM connected state 130 and/or the GPRS packet transfer mode 132, the WTRU may have uplink or/and downlink radio resources allocated to it and may transmit and/or receive data. The idle states may include the GSM idle state and/or the GPRS packet idle state 136. At 134, the WTRU may transition between the GSM connected state 130 and the GSM idle state 136 or the GPRS packet transfer mode state 132 and the GPRS packet idle state 136. The WTRU may establish a connection with one state and/or release the resources for the other state.

At 140, the WTRU may perform reselection from the RRC connected state 102 to the GSM idle state/GPRS packet idle state 136. The WTRU may perform cell change over (CCO) reselection from a GSM/GPRS packet connected state 130, 132 to the RRC idle state 104 at 138. At 142, the WTRU may perform CCO reselection from the RRC idle state 104 to the GSM idle/GPRS packet idle state 136. The WTRU may perform CCO reselection from the GSM idle/GPRS packet idle state 136 to the RRC idle state 104 at 144.

While various connected states and idle states are provided as examples in FIG. 1, any connected state and/or idle state may be implemented. The connected states may be implemented to enable the WTRU to transmit and/or receive data. The power saving connected states and/or the idle states may be implemented to reduce power consumption at the WTRU.

Figure 2:
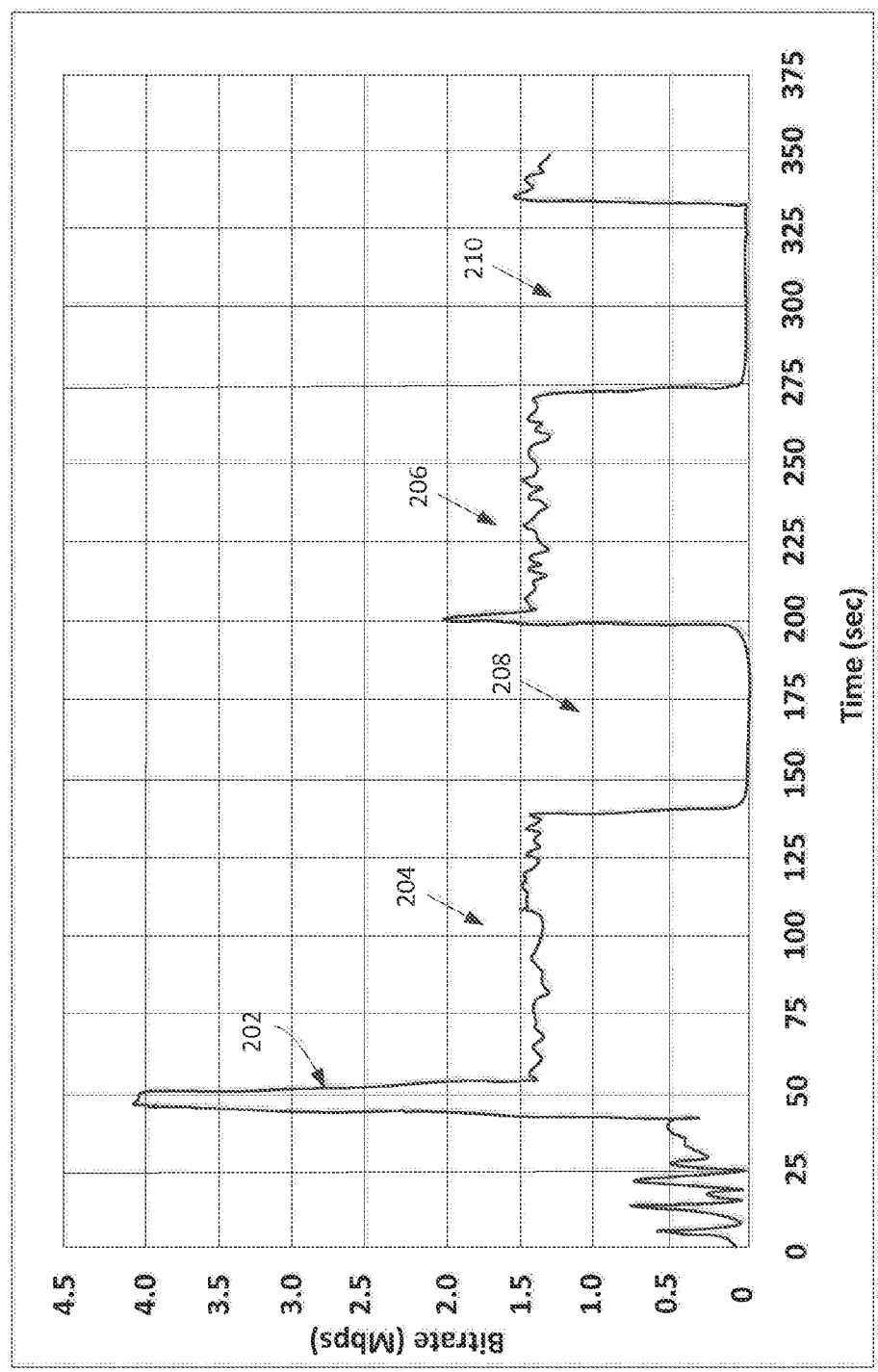
FIG. 2 is a graph that depicts an example for streaming video content from a content provider.

FIG. 2 is a graph that depicts an example for streaming video content 202 from a content provider (e.g., Hulu®, Youtube®, Netflix®, etc.). The content provider may provide the video content 202 from one or more content providing devices that may be capable of storing and/or transmitting video content. The video content 202 may be streamed as ad-sponsored video streaming. The video content 202 may be provided at a bitrate between about 4.0 Mbps and about 1.4 Mbps. The average bitrate may be about 850 Kbps.

The video content 202 may be transmitted and/or received in intervals. The intervals of video transmission 204, 206 may be followed by intervals of inactivity 208, 210. The intervals of transmission 204, 206 may be about seventy-five seconds. The intervals of inactivity 208, 210 may be about seventy-five seconds. During these intervals of inactivity 208, 210, the WTRU may put the transmit/receive module into a power saving state. For example, the WTRU may transition to a short DRX mode, a long DRX mode, or a CELL_FACH state during intervals of inactivity 208, 210. If the intervals of inactivity are longer than the inactivity timer for transitioning into the idle state, the WTRU may transition from a connected state in intervals of transmission 204, 206 to idle mode in intervals of inactivity 208, 210.

Figure 3:
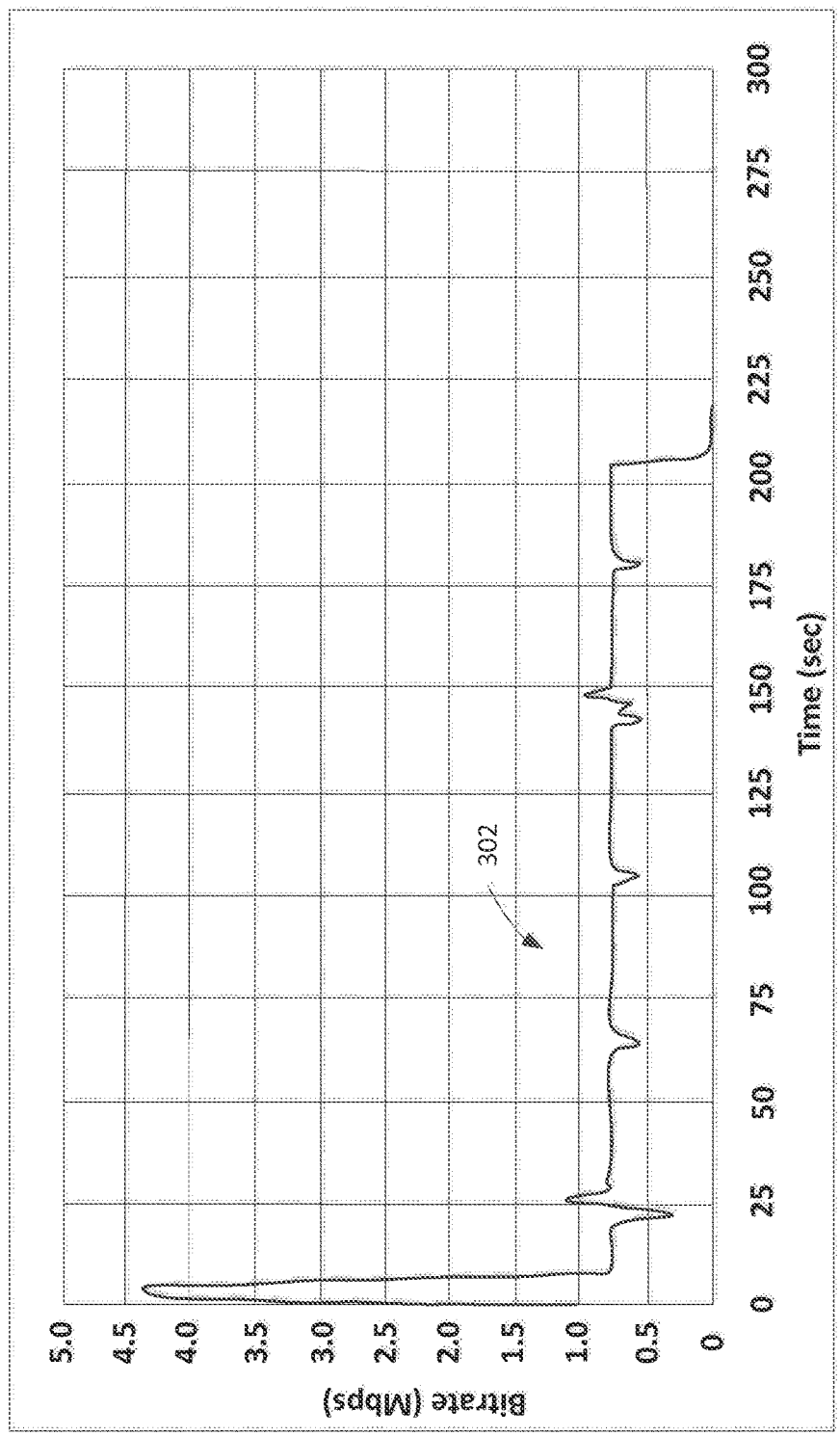
FIG. 3 is another graph that depicts an example for streaming video content from a content provider

A WTRU may have a static nature of treating intervals of multimedia traffic. For example, a WTRU may assume video segments are transmitted between the same inactivity timers. FIG. 3 is a graph that depicts an example for streaming video content 302 from a content provider (e.g., Hulu®, Youtube®, Netflix®, etc.). The video content 302 may be provided at a bitrate between about 4.5 Mbps and about 0.3 Mbps. The average bitrate may be about 602 Kbps. The video content 302 may be split into a number of N chunks to allow or enable a WTRU to transition from a connected state into a power saving state in a connected mode or an idle mode. For example, the WTRU may transition from a DCH state to a FACH state to reduce or save energy. The reduction in energy may be by about eighty percent, for example. The WTRU may send a message (e.g., an RRC message) to transition into an idle state and/or release radio resources after a chunk is received. The transition into the idle state and/or the release of radio resources may be performed prior to waiting for expiration of an inactivity timer for transitioning into the idle state. This early transition into idle state and/or release of resources may be referred to as fast dormancy.

A WTRU may use dynamic cache management to cache chunks of the video content. Power may be saved by using dynamic cache management to enable the WTRU to download content in chunks as fast as possible and/or releasing network resources, which may be referred to as fast dormancy. The WTRU may turn off the transmit/receive module to save power. The WTRU may close the connection (e.g., transmission control protocol (TCP) connection) when the cache may be full.

Power consumption models may be used for decoding media content in WTRUs. The power consumed for hardware accelerated decoding of media content at WTRUs may be determined as described herein. The media content may include video content, such as H.264 video content for example, images, audio content, and/or other types of media content. The decoding of video content may be modeled as a multiplicative of three exponential functions of main H.264 encoding parameters, as shown in Equation (1):

$$P(s, t, q) = P_{max}\left(\frac{s}{s_{max}}\right)^{c_s}\left(\frac{t}{t_{max}}\right)^{c_t}\left(\frac{q}{q_{min}}\right)^{c_q} \quad \text{Equation (1)}$$

where s may be the resolution, t may be the frame rate, q may be the quantization parameter, and/or $P_{max}=P(s_{max}, t_{max}, q_{max})$. Variables $c_s$, $c_t$, and/or $c_q$ may be modeling parameters that may be constants that may be used to obtain an accurate model. For example, the modeling parameters $c_s=0.4$, $c_t=0.25$, and/or $c_q=0.0$ may be used for Equation 1.

The power consumption of the display may be modeled as shown in Equation (2) below:

$$P_{display}(i) = \sum_{x,y} \alpha R(x, y; i) + \beta G(x, y; i) + \gamma B(x, y; i), \quad \text{Equation (2)}$$

where variable i may be an instant time, x and y may be coordinates of the pixel (e.g., row and column coordinates). R, G, and B may be the red, green, and blue components, respectively, of a pixel displayed on a screen. For example, R(x, y, i) may be the value of a pixel (x,y) at an instant i. Variables α, β, and γ may be modeling parameters that may be determined to obtain an accurate model. For example, a display on a WTRU may use α=1.02, β=1.91, and/or γ=2.43 in Equation 2 to determine the power consumption of the display. For some WTRUs, display power consumption may be constant (e.g. ≈250 mW).

The power model parameters obtained using Equation (1) may be applied to power-rate optimized adaptive video streaming, where a maximum quality (Q) may be searched subject to rate R and power constraints P as showing in Equation (3) below:

$$\max Q(s,t,q)$$
$$\text{subject to: } R(s,t,q) < R_0, P(s,t,q) < P_0. \quad \text{Equation (3)}$$

Mobile streaming of multimedia content may be performed based on the power consumption level associated with the multimedia data. Mobile multimedia streaming may be performed to preserve power consumption at the WTRU. Streaming protocols and/or file formats may include a decoding complexity that may be used to predict the amount of power consumption that may be caused by or due to receiving, decoding, and/or displaying of the underlying media streams. For example, the decoding complexity may include power consumption descriptors that may indicate an amount of power that may be consumed when receiving, decoding, and/or displaying multimedia content.

Figure 4:
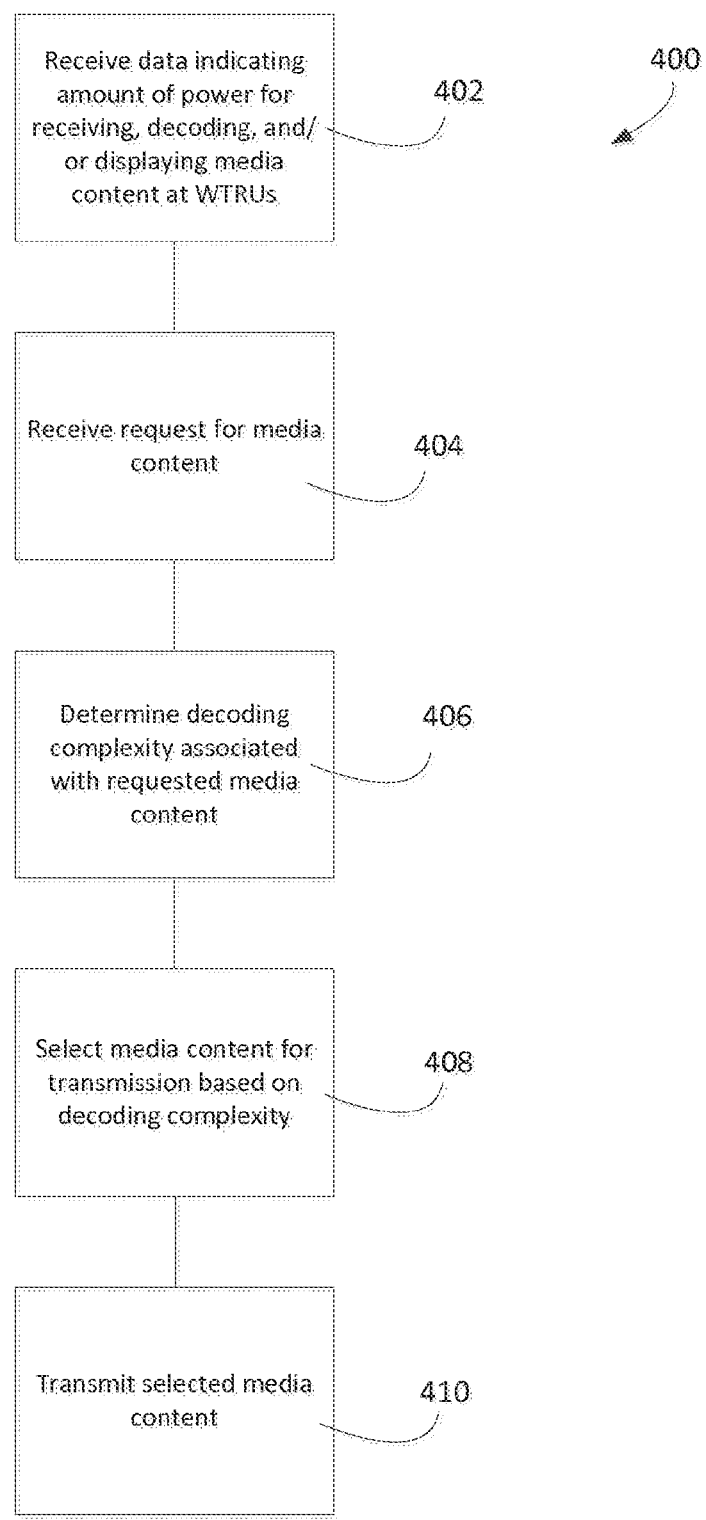
FIG. 4 is a flow diagram that illustrates an example process for transmitting media content based on a decoding complexity.

FIG. 4 is a flow diagram that illustrates an example process 400 for transmitting media content based on a decoding complexity. The multimedia content may include video streams, images, audio, and/or other forms of multimedia data transmitted using the communication system. One or more portions of the process 400 may be performed by content providing devices, such as a content providing server or servers for example. As shown at 402, the content providing device may receive data that may indicate an amount of power for receiving, decoding, and/or displaying media content at WTRUs. The data may be actual data that may be measured by WTRUs that have received, decoded, and/or displayed the media content. The data measured by the WTRUs may be stored at the content providing device and/or a remote location that may be accessible to the content providing device.

The content providing device may receive a request for the media content at 404. The request may be received from a WTRU or other network entity. At 406, the content providing device may determine a decoding complexity associated with the requested media content. The decoding complexity may indicate the amount of power used to receive, decode, and/or display the media content at one or more WTRUs. The decoding complexity may be an absolute value or a relative value. For example, an absolute value of a decoding complexity may be followed by relative values that may indicate an increase or decrease in the decoding complexity. The decoding complexity may be based on the data received at 402. For example, the decoding complexity may indicate a minimum amount of power, a maximum amount of power, and/or an average amount of power used by WTRUs that have received, decoded, and/or displayed the media content. The WTRUs that have received, decoded, and/or displayed the media content may include the WTRU requesting the media content.

The decoding complexity may include separate representations for receiving the media content, decoding the media content, and/or displaying the media content. The separate decoding complexity representations for receiving, decoding, and/or displaying the media content may allow WTRUs to tailor the complexity information based on its current state. For example, display power may be scaled to account for user brightness settings at the WTRU.

Different types of the requested media content may be available for transmission to the WTRU. For example, where the media content includes video content, standard definition and high definition video content may be available. The decoding complexity may indicate a minimum amount of power, a maximum amount of power, and/or an average amount of power used by the WTRUs for decoding each type of media content. The decoding complexity may be different for different types of media content. For example, standard definition video content may have a lower decoding complexity and may use less power than high definition video content.

Media content may be encoded using different video encoding profiles. For example, in H.264, a media content type may use a baseline profile, a main profile, a high profile, etc. Each profile may use a different set of encoding/decoding tools. Lower profiles (e.g., baseline profile) may be used to limit complexity and/or power consumption at the WTRU. Media content may be encoded using the same resolution (e.g., full HD-1080p) and may use different video encoding profiles.

Media content may be encoded with different coding tools. Media content may be encoded with/without coding tools that may increase decoding complexity. For example, context-adaptive binary arithmetic coding (CABAC) may be more complex than variable-length coding (VLC). Media content may be encoded using the same profile, but with/without coding tools. For a given profile, some coding tools may be optional. If the coding tools are not used, the WTRU may see a lower decoding complexity. Media content may be encoded using the same profile, but using different coding tools.

The content providing device may select the media content for transmission at 408. The media content may be selected at 408 based on the decoding complexity. In order to select the media content, the content providing device may send an indication of the decoding complexity associated with the requested media content to the WTRU. The content providing device may receive an indication from the WTRU of whether the WTRU would like to receive the media content based on the associated decoding complexity. The content providing device may transmit the selected media content at 410.

When there are different types of media content available at the content providing device, the content providing device may send an indication of one or more of the available types of content and/or the decoding complexity associated with each type. The content providing device may receive an indication from the WTRU of a preferred type of media content based on the decoding complexity associated therewith, and may select this content at 408 for transmission. The content providing device may pre-filter the types of media content that may be sent to the WTRU based on the decoding complexity. The content providing device may know the WTRU type, available power of the WTRU, and/or the power consumption configurations of the WTRU. The WTRU type, available power of the WTRU, and/or the power consumption configurations of the WTRU may be received from the WTRU or may be stored at the content providing device or other remote location and may be looked up based on an identifier associated with the WTRU. The WTRU identifier, the WTRU type, the WTRU power configurations, and/or the available power of the WTRU may be included in the request for media content received at 404. The content providing device may use the device type, available power, and/or the power consumption configurations to determine whether the WTRU can process certain types of media content.

The content providing device may provide the decoding complexity of media content that may be relevant to a device based on the device configurations and/or device specifications of the WTRUs that have provided the decoding complexity feedback. For example, when a WTRU requests media content from a content providing device, the request may include an identifier of the WTRU. The identifier may be a unique identifier or one or more device configurations or specifications associated with the device. The content providing device may determine the relevant decoding complexity information based on the WTRU identification information provided by the WTRU and may provide decoding complexity information that may be tailored to the WTRU.

The content providing device may provide the decoding complexity information along with device identification information that may identify devices to which the decoding complexity information may be relevant. For example, when a WTRU requests media content from a content providing device, the content providing device may provide the decoding complexity for the media content, along with one or more identifiers that may indicate the devices to which the decoding complexity may be relevant. The content providing device may provide different versions of the decoding complexity such that the WTRU may determine the version of the decoding complexity is relevant, or most relevant, to the WTRU.

The content providing device may autonomously select the media content at 408 based on the decoding complexity. The content providing device may use the device identifier and/or the WTRU configurations and/or specifications (e.g., device type, make, model, etc.) to select the media content to be transmitted at 408. The device configurations and/or specifications may be available in the HTTP header of a request received from the WTRU, for example. The content providing device may determine whether the WTRU has enough power available for receiving, decoding and/or displaying the requested media content. The content providing device may determine whether the decoding complexity of the media content is within an acceptable range. When there are multiple types of the requested media content, the content providing device may select the type of content that is appropriate for transmission to the WTRU based on the WTRU type, the WTRU power configurations, and/or the available power of the WTRU.

Another network device, such as a Node B for example, may select the media content at 408 based on the decoding complexity. The network device may use the device identifier and/or the WTRU configurations and/or specifications (e.g., device type, make, model, etc.) to select the media content to be transmitted at 408. The device configurations and/or specifications may be available in the HTTP header of a request received from the WTRU, for example. The network device may determine whether the WTRU has enough power available for receiving, decoding and/or displaying the requested media content. The network device may determine whether the decoding complexity of the media content is within an acceptable range. When there are multiple types of the requested media content, the network device may select the type of content that is appropriate for transmission to the WTRU based on the WTRU power configurations, the WTRU power configurations, network configurations (e.g., bandwidth), and/or the available power of the WTRU.

Figure 5:
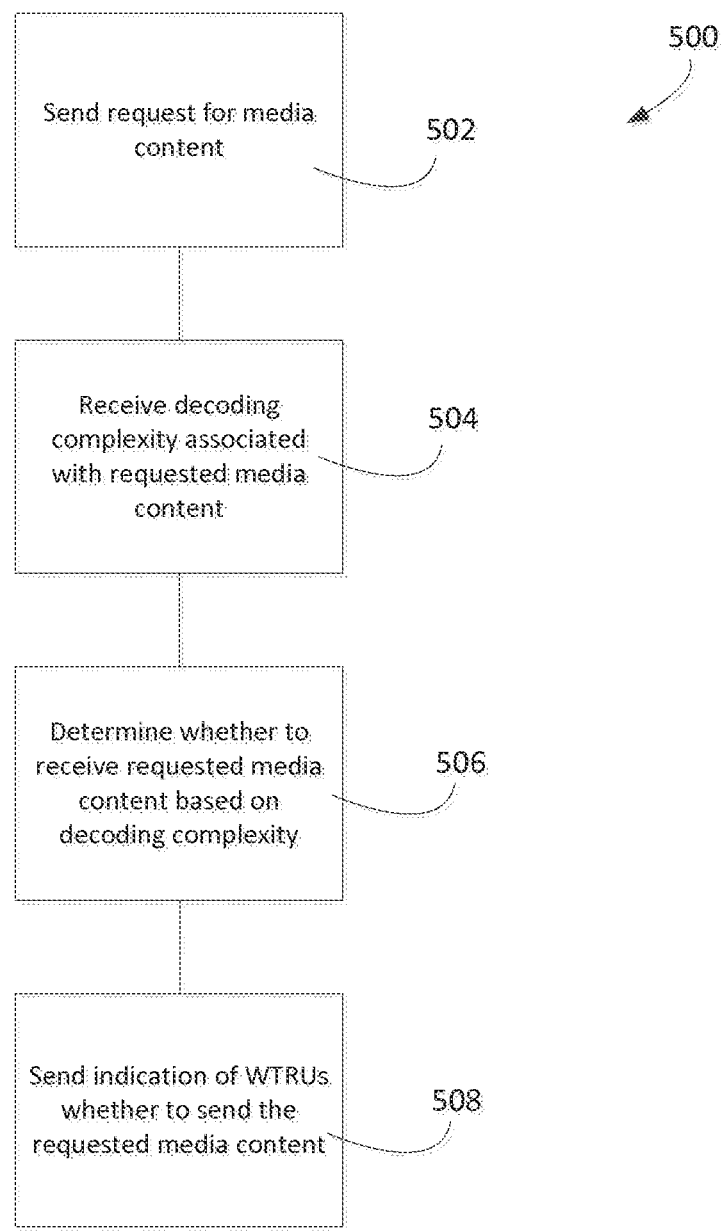
FIG. 5 is a flow diagram that illustrates an example process for selecting multimedia content based on a decoding complexity.

FIG. 5 is a flow diagram that illustrates an example process 500 for selecting multimedia content based on a decoding complexity. One or more portions of the process 500 may be performed by a WTRU or other network device. As shown at 502, the WTRU may request media content from a content providing device. At 504, the WTRU may receive a decoding complexity associated with the requested media content. The decoding complexity may indicate the amount of power that may be used to receive, decode, and/or display the media content at the WTRU. The decoding complexity may indicate power metrics for the power used by other WTRUs that have received, decoded, and/or displayed the media content. For example, the decoding complexity may indicate a minimum amount of power, a maximum amount of power, and/or an average amount of power used by other WTRUs that have received, decoded, and/or displayed the media content.

The WTRU may determine whether to receive the media content at 506 based on the decoding complexity. For example, the WTRU may determine its current battery power and/or whether it has enough battery power available for decoding the requested content. The WTRU may determine whether the decoding complexity is within an acceptable range based on the current batter power. When there are different types of media content available at the content providing device, the WTRU may receive an indication of the decoding complexity for the different types of media content. For example, the WTRU may receive a minimum amount of power, a maximum amount of power, and/or an average amount of power used by the WTRUs for receiving, decoding, and/or displaying each type of media content. The WTRU may select a preferred type of media content based on the decoding complexity associated with each type of media content.

The WTRU may send an indication at 508 to indicate whether it wants to receive the requested media content. The WTRU may also indicate the type of media content that it would like to receive. The indication may be sent at 508 in response to the decoding complexity received from the content providing device. If the WTRU indicates at 508 that it wants to receive the media content and/or a selected type of media content, the WTRU may receive the media content in response to the indication. The media content may be streamed via a communication network and/or stored at the WTRU for playback. If the WTRU indicates at 508 that it does not want to receive the media content, the media content may not be transmitted to the WTRU, or the WTRU may ignore the transmission.

Figure 6:
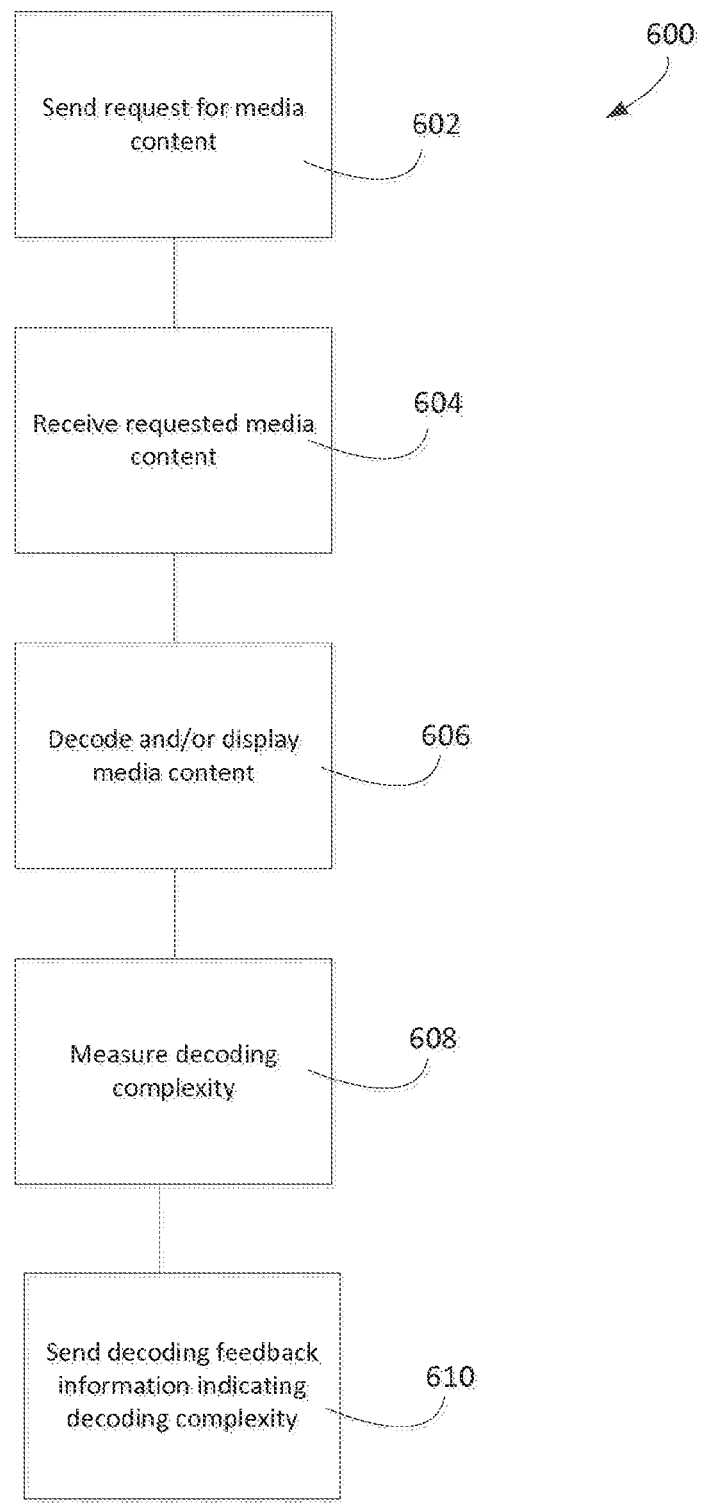
FIG. 6 is a flow diagram that illustrates an example process for measuring decoding complexity and/or sending decoding complexity feedback information that indicates the decoding complexity.

FIG. 6 is a flow diagram that illustrates an example process 600 for measuring decoding complexity and/or sending decoding complexity feedback information that indicates the decoding complexity. One or more portions of the process 600 may be performed by a WTRU. As shown at 602, the WTRU may request media content from a content providing device. At 604, the WTRU may receive the requested media content. The media content may be streamed via a communication network and/or stored at the WTRU for playback. The WTRU may decode and/or display the media content at 606. The WTRU may measure the decoding complexity at 608. For example, the WTRU may measure the amount of power used while receiving, decoding, and/or displaying the media content. The WTRU may measure the maximum value, minimum value, and/or average value of power used by the WTRU. The average value may be calculated by the minimum value plus the maximum value divided by two (e.g., (minValue+maxValue)/2) or by calculating the average power value used over a period of time (e.g., the period for receiving, decoding, and/or displaying the media content or a segment thereof). If the media content is segmented at the WTRU, the WTRU may perform the measurements at 608 for each segment of the media content.

The WTRU may send decoding complexity feedback information to a remote source at 610. For example, the WTRU may send the decoding complexity feedback information to the content providing device and/or another network device for storage. The decoding complexity feedback information may be aggregated from multiple devices, such as in the form of a database for example. The decoding complexity feedback information may inform the content providing device of the actual decoding complexity for receiving, decoding, and/or displaying the multimedia content. A separate decoding complexity representation may be used by WTRUs to report decoding complexity for receiving media content, decoding media content, and/or displaying media content. The decoding complexity feedback information may be stored and/or used to send the decoding complexity to other receiving devices.

The decoding complexity feedback information may also include a time at which the decoding complexity was measured, a duration for which the decoding complexity was measured, and/or device configurations and/or specifications for the device measuring the decoding complexity. The device configurations and/or specifications may include a device type, make, model, release date, OS version, device drivers, player agent, available power, power consumption configurations, and/or the like. The decoding complexity feedback information may be used to provide the decoding complexity to WTRUs.

The decoding complexity may be included in a file format or protocol. For example, the decoding complexity may be included in a media presentation descriptor (MPD) of a dynamic adaptive streaming over HTTP (DASH), a session description protocol (SDP) of an IP multimedia subsystem (IMS), a real time streaming protocol (RTSP), a file format such as a 3GP file format, and/or the like.

A streaming protocol may include a value that indicates the decoding complexity. For example, the protocol structure may include an abstract called DecodingComplexity and/or may include values that indicate the decoding complexity associated with media content being streamed via the protocol. Provided below is an example of an abstract function called DecodingComplexity that may be used in a streaming protocol:

```
Struct DecodingComplexity {
    Bool Absolute;
    Int minValue,maxValue,avrValue;
    Char Units[8];
};.
```

As shown above, the DecodingComplexity function may include one or more decoding complexity values, a value indicating whether the decoding complexity value is an absolute value or a relative value, and/or a units value that may indicate the units in which the decoding complexity values are measured. The value indicating whether the decoding complexity value is an absolute value or a relative value may be a boolean value that may be used to identify if one or more of the reported values minValue, maxValue and/or avrValue may be an absolute or relative value. If the decoding complexity values are relative values, the values may be expressed as a relative increase or decrease from previous values. The decoding complexity may include the values minValue, maxValue, and/or avrValue. The decoding complexity may represent a variability of the amount of power and/or time it may take a WTRU to receive, decode, and/or display media content, such as a video stream, a video frame, a video file, an audio file, images, and/or other types of media content.

The decoding complexity may be based on values measured by a reference device. The reference device may be another WTRU. The reference device may be similarly configured to the device requesting the media content. For example, the reference device may have the same device type, make, model, release date, OS version, device drivers, player agent, available power, power consumption configurations, and/or the like. One or more of the configurations of the reference device may also be different, but may be relevant for predicting the amount of power that may be used by the device requesting the media content. The device configurations may be included in metadata. The metadata about the configurations of the reference device may be included in a user defined box within a file format, such as a 3GP file format for example, or may be sent in an outbound signaling protocol, such as an email or an HTTP websocket for example.

When the media content includes video streams, the decoding complexity may be used to select the appropriate video stream. For example, the avrValue may be used to select the appropriate video stream. The avrValue may be used when video streams may include a small number of frames or shorter videos. Video streams that include a small number of frames or shorter videos may include videos less than a minute (e.g., 30 seconds) or a number of minutes. The minValue and/or the maxValue may be used to capture variability of frame decoding time. The minValue and/or the maxValue may be used with a larger number of video frames or longer videos. Longer videos or videos with a larger number of frames may be larger than the shorter videos. For example, the longer videos may be longer than an hour (e.g., 2 hours). The avrValue may be estimated as (minValue+maxvalue)/2 or may be calculated as an average value of each of the known reference devices or a subset of the reference devices (e.g., reference devices with similar configurations).

The decoding complexity function may include the units at which the values are measured. For example, the decoding complexity function may include a string value for the units that may indicate the units for the minValue, maxValue and/or avrValue. The units value may be in milliseconds (msec), million instructions per second (MIPS), milliwatts (mW), and/or the like. The maximum number of characters for the units value may be a fixed number (e.g., 8 characters) or a variable number. While an example is provided for the abstract decoding complexity function above, the decoding complexity may be modified and/or implemented for each streaming protocol.

The decoding complexity may be included in the moving picture experts group (MPEG) DASH protocol. The media presentation description (MPD) in the MPEG DASH protocol may be used to indicate the decoding complexity. For example, decoding complexity descriptors may be included in the MPEG DASH schema at a period, an adaptation set, a representation, and/or the like. The adaptation set may include the set of different types of media files stored at a content providing device. The representation may include a media file in the adaptation set. A representation may include a different version of the same media content. For example, different representations of the same video clip may be encoded at different bit rates and/or different resolutions. A multimedia content may include a presentation (e.g., a video clip or movie) that may be partitioned into periods. For example, a period may be a chapter in the presentation. In between periods, ads may be displayed. Each period may be partitioned into segments (e.g., two to ten second segments).

The decoding complexity may be included at the period level to inform the WTRU, or another device, about the minimum and/or maximum expected power resources that may be used to receive, decode, and/or display a representation of an adaptation set(s). The decoding complexity values may be absolute values or may be relative values that may reference a decoding complexity in a prior period. The absolute value may be included in the first period in a presentation, for example. Subsequent periods may include a value relative to the first period. The relative values may reference the absolute value.

Provided below is an example of an extensible markup language (XML) scheme for the period. The XML scheme includes a minDecodingComplexity and a maxDecodingComplexity as a string value "xs:string." A similar XML scheme may be implemented that includes other forms of decoding complexity, such as average decoding complexity and/or the like.

```
<!-- Period of a presentation -->
  <xs:complexType name="PeriodType">
```

```
    <xs:sequence>
        <xs:element name="BaseURL" type="BaseURLType"
        minOccurs="0"
   maxOccurs="unbounded"/>
        <xs:element name="SegmentBase" type="SegmentBaseType"
        minOccurs="0"/>
        <xs:element name="SegmentList" type="SegmentListType"
        minOccurs="0"/>
        <xs:element name="SegmentTemplate"
        type="SegmentTemplateType"
   minOccurs="0"/>
        <xs:element name="AdaptationSet" type="AdaptationSetType"
        minOccurs="0"
          maxOccurs="unbounded"/>
        <xs:any namespace="##other" processContents="lax"
        minOccurs="0"
   maxOccurs="unbounded"/>
    </xs:sequence>
    <xs:attribute ref="xlink:href"/>
    <xs:attribute ref="xlink:actuate" default="onRequest"/>
    <xs:attribute name="id" type="xs:string"/>
    <xs:attribute name="start" type="xs:duration"/>
    <xs:attribute name="duration" type="xs:duration"/>
    <xs:attribute name="bitStreamSwitching" type="xs:boolean"
    default="false"/>
    <xs:attribute name="minDecodingComplexity" type="xs:string"
        minOccurs="0"
   maxOccurs="1"/>
    <xs:attribute name="maxDecodingComplexity" type="xs:string"
        minOccurs="0"
   maxOccurs="1"/>
    <xs:anyAttribute namespace="##other" processContents="lax"/>
  </xs:complexType>
```

The string representing minimum decoding complexity and/or the string representing the maximum decoding complexity may be formatted having sub-strings. The sub-strings may be separated by commas or other indicators to show the separation between sub-strings. The substrings may indicate whether the decoding complexity is an absolute or relative value, the decoding complexity value, and/or the units of each decoding complexity value. For example, the substrings may indicate that the decoding complexity is an absolute value, the value of the decoding complexity, and/or the units in a comma-delimited list (e.g., minDecodingComplexity=1, 100, MIPS). While the decoding complexity is represented as a string value, the decoding complexity may be represented as one or more integer values that may indicate whether the decoding complexity is an absolute or relative value, the decoding complexity value, and/or the units of each decoding complexity value.

The decoding complexity may be included at the adaptation set level. This may provide a finer level of adaptation than including the decoding complexity at the period level. At the adaptation set level, the decoding complexity may include the minimum, maximum, and/or average expected processing that may be used to receive, decode, and/or display a representation of the adaptation set. The decoding complexity at the adaptation set level may include absolute or relative values. The relative values may refer to a prior relative or absolute value. For example, the first adaptation set within a period may include absolute values for the decoding complexity and/or subsequent adaptation set(s) may include absolute or relative values for the decoding complexity.

The adaptation set may include a minimum decoding complexity, a maximum decoding complexity, and/or an average decoding complexity. Provided below is an example of an XML scheme for the adaptation set that includes the minimum decoding complexity, the maximum decoding complexity, and the average decoding complexity as an "xs:string" value.

```xml
<!-- Group to contain information common to an adaptation set;
        extends RepresentationBaseType -->
    <xs:complexType name="AdaptationSetType">
        <xs:complexContent>
            <xs:extension base="RepresentationBaseType">
                <xs:sequence>
                    <xs:element name="Accessibility" type="DescriptorType" minOccurs="0" maxOccurs="unbounded"/>
                    <xs:element name="Role" type="DescriptorType" minOccurs="0" maxOccurs="unbounded"/>
                    <xs:element name="Rating" type="DescriptorType" minOccurs="0" maxOccurs="unbounded"/>
                    <xs:element name="Viewpoint" type="DescriptorType" minOccurs="0" maxOccurs="unbounded"/>
                    <xs:element name="ContentComponent" type="ContentComponentType" minOccurs="0" maxOccurs="unbounded"/>
                    <xs:element name="BaseURL" type="BaseURLType" minOccurs="0" maxOccurs="unbounded"/>
                    <xs:element name="SegmentBase" type="SegmentBaseType" minOccurs="0"/>
                    <xs:element name="SegmentList" type="SegmentListType" minOccurs="0"/>
                    <xs:element name="SegmentTemplate" type="SegmentTemplateType" minOccurs="0"/>
                    <xs:element name="Representation" type="RepresentationType" minOccurs="0" maxOccurs="unbounded"/>
                    <xs:any namespace="##other" processContents="lax" minOccurs="0" maxOccurs="unbounded"/>
                </xs:sequence>
                <xs:attribute ref="xlink:href"/>
                <xs:attribute ref="xlink:actuate" default="onRequest"/>
                <xs:attribute name="id" type="xs:string"/>
                <xs:attribute name="group" type="xs:unsignedInt"/>
                <xs:attribute name="lang" type="xs:language"/>
                <xs:attribute name="contentType" type="xs:string"/>
                <xs:attribute name="minBandwidth" type="xs:unsignedInt"/>
                <xs:attribute name="maxBandwidth" type="xs:unsignedInt"/>
                <xs:attribute name="minWidth" type="xs:unsignedInt"/>
                <xs:attribute name="maxWidth" type="xs:unsignedInt"/>
                <xs:attribute name="minHeight" type="xs:unsignedInt"/>
                <xs:attribute name="maxHeight" type="xs:unsignedInt"/>
                <xs:attribute name="minFrameRate" type="FrameRateType"/>
                <xs:attribute name="maxFrameRate" type="FrameRateType"/>
                <xs:attribute name="segmentAlignment" type="ConditionalUintType" default="false"/>
                <xs:attribute name="subsegmentAlignment" type="ConditionalUintType" default="false"/>
                <xs:attribute name="subsegmentStartsWithSAP" type="SAPType" default="0"/>
                <xs:attribute name="bitStreamSwitching" type="xs:boolean"/>
                <xs:attribute name="minDecodingComplexity" type="xs:string" minOccurs="0" maxOccurs="1"/>
                <xs:attribute name="maxDecodingComplexity" type="xs:string" minOccurs="0" maxOccurs="1"/>
                <xs:attribute name="avrDecodingComplexity" type="xs:string" minOccurs="0" maxOccurs="1"/>
            </xs:extension>
        </xs:complexContent>
    </xs:complexType>
<!-- Conditional Unsigned Integer (unsignedInt or boolean) -->
<xs:simpleType name="ConditionalUintType">
 <xs:union memberTypes="xs:unsignedInt xs:boolean"/>
</xs:simpleType>
```

The string representing the minimum decoding complexity, the maximum decoding complexity, and/or the average decoding complexity may be formatted having sub-strings, as described herein. While the decoding complexity is represented as a string value, the decoding complexity may be represented as one or more integer values, as described herein.

The decoding complexity may be included at the representation level. The representation level may provide a finer level of adaptation compared to the period and/or the adaptation set level. The minimum, maximum, and/or average expected consumption of power resources that may be used to receive, decode, and/or display a segment or sub-representation may be included at the representation level.

The decoding complexity at the representation level may include absolute or relative values. The relative values may the relative to a prior absolute or relative value. For example, the first representation within an adaptation set may include an absolute value. Subsequent representation(s) may include absolute or relative values.

The decoding complexity at the representation level may include a minimum decoding complexity, a maximum decoding complexity, and/or an average decoding complexity. Provided below is an example of an XML scheme for the representation level that includes the minimum decoding complexity, the maximum decoding complexity, and the average decoding

```xml
<!-- A Representation of the presentation content for a specific Period -->
    <xs:complexType name="RepresentationType">
        <xs:complexContent>
            <xs:extension base="RepresentationBaseType">
                <xs:sequence>
                    <xs:element name="BaseURL" type="BaseURLType" minOccurs="0" maxOccurs="unbounded"/>
                    <xs:elementname="SubRepresentation" type="SubRepresentationType" minOccurs="0"/>
                    <xs:element name="SegmentBase" type="SegmentBaseType" minOccurs="0"/>
                    <xs:element name="SegmentList" type="SegmentListType" minOccurs="0"/>
                    <xs:element name="SegmentTemplate" type="SegmentTemplateType" minOccurs="0">
                </xs:sequence>
                <xs:attribute name="id" type="StringNoWhitespaceType" use="required"/>
                <xs:attribute name="bandwidth" type="xs:unsignedInt" use="required"/>
                <xs:attribute name="qualityRanking" type="xs:unsignedInt"/>
                <xs:attribute name="mediaStreamStructureId" type="StringVectorType"/>
                <xs:attribute name="minDecodingComplexity" type="xs:string" minOccurs="0" maxOccurs="1"/>
                <xs:attribute name="maxDecodingComplexity" type="xs:string" minOccurs="0" maxOccurs="1"/>
                <xs:attribute name="avrDecodingComplexity" type="xs:string" minOccurs="0" maxOccurs="1"/>
            </xs:extension>
        </xs:complexContent>
    </xs:complexType>
    <!-- String without white spaces -->
    <xs:simpleType name="StringNoWhitespaceType">
        <xs:restriction base="xs:string">
            <xs:pattern value="[^\r\n\t \p{Z}]*"/>
        </xs:restriction>
    </xs:simpleType>
<!-- Whitespace-separated list of strings -->
<xs:simpleTypename="StringVectorType">
    <xs:list itemType="xs:string"/>
</xs:simpleType>
```

The string representing the minimum decoding complexity, the maximum decoding complexity, and/or the average decoding complexity may be formatted having sub-strings, as described herein. While the decoding complexity is represented as a string value, the decoding complexity may be represented as one or more integer values, as described herein.

The decoding complexity may also be included at the sub-representation level in a similar manner as the representation level. A sub-representation may be used to provide a version of a representation to enable a video player to fast-forward and/or rewind efficiently. The sub-representation may be a lower-quality than the version of a representation. Provided below is an example of an XML scheme for the sub-representation level that includes the minimum decoding complexity, the maximum decoding complexity, and the average decoding

```xml
<!-- SubRepresentation -->
<xs:complexType name="SubRepresentationType">
 <xs:complexContent>
  <xs:extension base="RepresentationBaseType">
<xs:attribute name="level" type="xs:unsignedInt"/>
<xs:attribute name="dependencyLevel" type="UIntVectorType"/>
<xs:attribute name="bandwidth" type="xs:unsignedInt"/>
<xs:attribute name="contentComponent" type="StringVectorType"/>
<xs:attribute name="minDecodingComplexity" type="xs:string" minOccurs="0" maxOccurs="1"/>
  <xs:attribute name="maxDecodingComplexity" type="xs:string" minOccurs="0" maxOccurs="1"/>
  <xs:attribute name="avrDecodingComplexity" type="xs:string" minOccurs="0" maxOccurs="1"/>
```

-continued

```xml
  </xs:extension>
 </xs:complexContent>
</xs:complexType>
<!-- Whitespace-separated list of unsigned integers -->
<xs:simpleType name="UIntVectorType">
<xs:list itemType="xs:unsignedInt"/>
</xs:simpleType>
```

While the decoding complexity is represented as a string value, the decoding complexity may be represented as one or more integer values, as described herein.

The decoding complexity, and/or other attributes, may be signaled in MPEG DASH using generic descriptors. The generic descriptors may be declared at the adaptation set level, the representation level, and/or the sub-representation level. The generic descriptors may indicate whether the decoding complexity is an essential or supplemental element of the MPEG DASH protocol. Essential protocol elements of the MPEG DASH protocol may be supported by each compliant video player. Supplemental protocol elements may include information that may or may not be understood each compliant video player.

Provided below is an example of an XML scheme for the representation level that includes generic descriptors that indicate the decoding complexity as a supplemental element of the MPEG DASH protocol.

```xml
<Representation id="720kbps" bandwidth="792000" width="640" height="368" >
    <SubRepresentation level="1" contentComponent="481" maxPlayoutRate="32"/>
```

```
    <SegmentBase timescale="90000"
presentationTimeOffset="162000000"/>
    <Supplemental
schemeIdUri="urn:sdoX:dashX:min-decoding-complexity"
value="10"/>
    <Supplemental
schemeIdUri="urn:sdoX:dashX:max-decoding-complexity"
value="100"/>
    <Supplemental
schemeIdUri="urn:sdoX:dashX:avg-decoding-complexity"
value="50"/>
  </Representation>
```

If uniform resource names (URNs) are used in the protocol, as shown above, the URNs may include "urn:sdoX:dashX:min-decoding-complexity" for the minimum decoding complexity, "urn:sdoX:dashX:max-decoding-complexity" for the maximum decoding complexity, and/or "urn:sdoX:dashX:avg-decoding-complexity" for the average decoding complexity.

The decoding complexity may be included as a parameter to a media streaming format. The media streaming format may be the session description protocol (SDP) for a session initiation protocol, a real-time streaming protocol (RTSP), and/or the like. The decoding complexity may be included in the SDP following a media attributes variable "m=video," for example. The decoding complexity may include the minimum, maximum, and/or average expected processing resources that may be used to receive, decode, and/or display the media stream. The decoding complexity may include absolute or relative values. The first media component within the SDP may include absolute values. Subsequent media components may include absolute or relative values. The relative values may be relative to the values in the first media component within the SDP or may be relative to the previous media component.

SDP may implement a decoding complexity attribute. For example, the decoding attribute "a" may be implemented as follows: a=DecodingComplexity:<decoding Absolute> <minDecodingComplexity> <maxDecodingComplexity> <avrDecodingComplexity> <decoding Units>. The decoding complexity attribute may include an indication of whether the decoding complexity is an absolute or relative value, a minimum decoding complexity, a maximum decoding complexity, an average decoding complexity, and/or the units for which the decoding complexity may be measured. The decoding complexity attribute may be sent during an initial offer and/or answer negotiation, such as a negotiation between the WTRU and the content providing device for example. The decoding complexity attribute may be sent during an ongoing video streaming session to modify one or more SDP attributes.

The decoding complexity may be included in real-time transport control protocol (RTCP) messages. For example, the decoding complexity may be included in an RTCP extension in an RTCP message. Content providing devices may send the decoding complexity in sender reports to one or more receiving devices, such as a WTRU or other network device for example.

The receiving devices may be reference devices that may send decoding complexity feedback information to the content providing devices to inform the content providing devices of the actual decoding complexity associated with selected multimedia content. For example, the receiving devices may include the actual decoding complexity in RTCP messages sent to the content providing devices. The decoding complexity feedback information may inform the content providing devices of the actual decoding complexity of selected media content at the receiving devices on which the media content has been received, decoded, and/or displayed. The decoding complexity feedback information may be stored at the content providing devices and/or used by the content providing devices to provide the decoding complexity to other receiving devices. The decoding complexity may be sent to other receiving devices during the initial SDP offer/answer negotiation, for example.

A codec control message (CCM) may be used to convey control messages that may carry feedback information from receiving devices to content providing devices. For example, the CCM may be used for a real-time transport protocol (RTP) audio-visual profile with feedback (AVPF) profile to convey the control messages. The control messages may include an intra-frame request and/or a temporary maximum bit rate.

Figure 7:
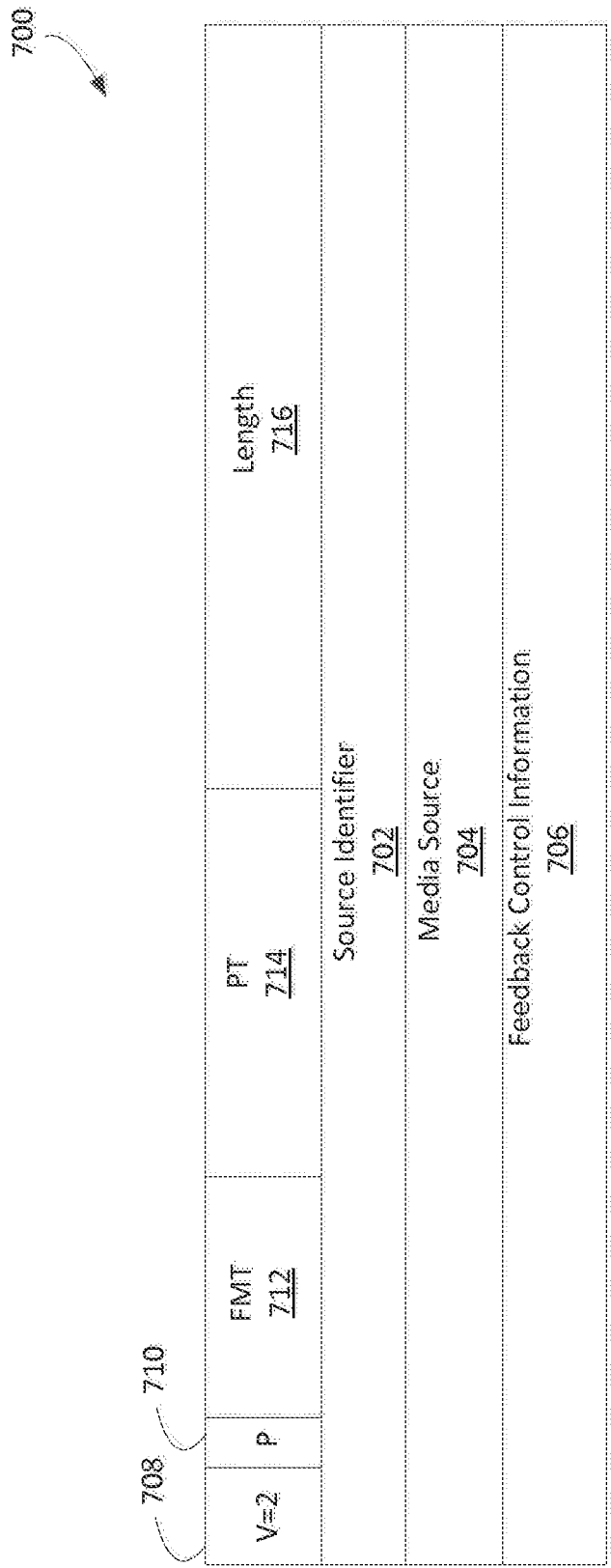
FIG. 7 is a diagram that depicts an example message that may be used for sending decoding complexity feedback information.

FIG. 7 is a diagram that depicts an example message 700 that may be used for sending decoding complexity feedback information. The message 700 may include a source identifier 702 of the message 700. The source identifier 702 may indicate the source from which the message 700 may be transmitted. The message 700 may include feedback control information 706. The feedback control information 706 may include the decoding complexity feedback information.

The feedback control information 706 may be indicated using a binary representation. A byte (e.g., the first byte) of the feedback control information 706 may indicate whether the decoding complexity feedback information is indicated as an absolute (e.g., '1') or relative (e.g., '0') measurement. A first message 700 may carry absolute measurements. Subsequent messages may carry relative measurements.

The feedback control information 706 may include a minValue, maxValue, and/or avrValue of the decoding complexity. The minValue, maxValue, and/or avrValue may follow (e.g., respectively) the byte indicating whether the decoding complexity feedback information is indicated as an absolute or relative value. The minValue, max Value, and/or avrValue may be 32-bit values. The feedback control information 706 (e.g., in the last bytes) may be assigned to the string of the units of measurement. The length of the RTCP packet may be used to determine the last character and/or the length of the string of the units. The number of bytes N in the length of the RTCP packet may be determined by subtracting the byte(s) indicating the absolute or relative value and/or the 32-bit values for the minValue, maxValue, and/or avrValue (e.g., 12 bits where all 3 are used). For example, the number of bytes N may be determined by N=(length of RTCP pkt)−12−1.

The message 700 may be in an RTCP format. The message 700 may include a header that may include version (V) field 708, a padding bit (P) field 710, a feedback message type (FMT) field 712, a payload type (PT) field 714, and/or a length field 716. The V field 708 may include a number of bits (e.g., 2 bits) that may identify the RTP version. The P field 710 may include a number of bits (e.g., 1 bit) that may indicate whether the packet includes additional padding octets at the end that may be included in the length field 716. The FMT field 712 may indicate the type of feedback message for the message 700. The message 700 may be interpreted relative to the FMT field 712. An FMT type of fifteen may indicate an application-layer feedback message, for example. The PT field 714 may include a number of bits (e.g., 8 bits) that may identify the packet type. The PT field 714 having a value of '206' may indicate that the packet type is an RTCP feedback message, for example.

The length field 716 may include a number of bits (e.g., 16 bits) that may indicate the length of the packet (e.g., in 32-bit words minus one), and may include the header and/or any padding bits.

The source identifier 702 may be a synchronization source (SSRC) packet sender field. The source identifier field 702 may include a number of bits (e.g., 32 bits) that may indicate the source of the message 700. The message 700 may include a media source field 704. The media source field 704 may be an SSRC media source field. The media source field 704 may be an identifier that may uniquely identify the source of the media. While the message 700 includes a number of fields, additional fields and/or a subset of the described fields may be implemented.

The decoding complexity may be indicated in media files. For example, decoding complexity descriptors may be included in metadata within the media files. Decoding complexity descriptors may be included within stored media files. The decoding complexity descriptors may indicate the amount of power that may be used to decode the media content in the media files. The decoding complexity descriptors may be based on actual data measured for receiving, decoding, and/or displaying the media files. For example, the decoding complexity descriptors may indicate a minimum value, a maximum value, and/or an average value of power used to receive, decode, and/or display the media file or portions (e.g., video frames, audio segments, etc.) thereof. The decoding complexity descriptors may indicate a minimum amount of time, a maximum amount of time, and/or an average amount of time to receive, decode, and/or display a media file or portions thereof. The decoding complexity descriptors may indicate a minimum amount of computing resources, a maximum amount of computing resources, and/or an average amount of computing resources to receive, decode, and/or display a media file or portions thereof. The decoding complexity descriptors may include absolute values or relative values. The relative values may indicate an increase or decrease value from a value of a prior relative decoding complexity descriptor. The decoding complexity descriptors may include the units for the decoding complexity values. Storing the media files with the decoding complexity may allow content providing devices to use the media files within the underlying streaming protocols.

The decoding complexity descriptors may indicate the decoding complexity of one or more segments of a segmented media file. Each segment may have its own decoding complexity descriptor, or a decoding complexity descriptor may indicate a decoding complexity for a group of segments. If a relative value is used to indicate the decoding complexity of a media file segment, the value may be relative to a decoding complexity value of a prior segment of the media file. For example, the first decoding complexity descriptor of a media file may include an absolute value, while other decoding complexity descriptors may include a relative value.

The media files may be in a 3GP file format. The 3GP media file may be configured for DASH streaming. The 3GP file format may be structurally based on the ISO media file format. The ISO media file format may be an object-oriented format. The objects in the ISO file format may be referred to as boxes. The boxes may include the media data. In a 3GP adaptive-streaming profile, the boxes may include video data. For example, in video profiles that are branded '3gh9', the media data may include movie data. The movie data may be included in movie fragment boxes (moofs).

In 3GP media files, the decoding complexity may be included in sample index data, a fragment header, and/or fragment decoding data. The decoding complexity may be indicated in sample index data using a segment index box (sidx). The sidx may provide a compact index of a track or sub-segment within the media segment to which it may apply. The sub-segment may be a media stream within the media segment, for example. The sidx may refer to other sidxs in a media segment which may refer to other sub-segments. Each sidx may document how a segment may be divided into one or more sub-segments.

The decoding complexity data for each sub-segment may be included in a sidx as shown below.

```
aligned(8) class SegmentIndexBox extends FullBox('sidx', version, 0) {
    unsigned int(32) reference_ID;
    unsigned int(32) timescale;
    if (version==0)
        {
            unsigned int(32) earliest_presentation_time;
            unsigned int(32) first_offset;
        }
    else
        {
            unsigned int(64) earliest_presentation_time;
            unsigned int(64) first_offset;
        }
    unsigned int(16) reserved = 0;
    unsigned int(16) reference_count;
    unsigned int(8) Absolute;
    unsigned int(8)[8] UnitsDecodingComplexity;
    for(i=1; i <= reference_count; i++)
    {
        bit (1)             reference_type;
        unsigned int(31)    referenced_size;
        unsigned int(32)    subsegment_duration;
        bit(1)              starts_with_SAP;
        unsigned int(3)     SAP_type;
        unsigned int(28)    SAP_delta_time;
        unsigned int(32)    minDecodingComplexity;
        unsigned int(32)    maxDecodingComplexity;
        unsigned int(32)    avrDecodingComplexity;
    }
}
```

The sidx box may include a minimum, maximum, and/or average decoding complexity. The decoding complexity in the sidx box may include absolute or relative values. The relative values may the relative to a prior absolute or relative value. For example, the first decoding complexity in a sidx box may include an absolute value. Subsequent decoding complexity values may include absolute or relative values. The sidx box may include the units of the decoding complexity.

The decoding complexity data for each sub-segment may be included in a track fragment header (tfhd) box. The tfhd box may provide basic information about each movie fragment of an underlying media track. The decoding complexity may be included in the header information for each fragment as shown below.

```
aligned(8) class TrackFragmentHeaderBox
    extends FullBox('tfhd', 0, tf_flags){
    unsigned int(32) track_ID;
        unsigned int(64) base_data_offset;
        unsigned int(32) sample_description_index;
        unsigned int(32) default_sample_duration;
        unsigned int(32) default_sample_size;
        unsigned int(32) default_sample_flags
        unsigned int(8) Absolute;
        unsigned int(32)    minDecodingComplexity;
        unsigned int(32)    maxDecodingComplexity;
        unsigned int(32)    avrDecodingComplexity;
```

```
        unsigned int(8)[8] UnitsDecodingComplexity;
}
```

The tfhd box may include a minimum, maximum, and/or average decoding complexity. The decoding complexity in the tfhd box may include absolute or relative values. The relative values may the relative to a prior absolute or relative value. For example, the first decoding complexity in a tfhd box may include an absolute value. Subsequent decoding complexity values may include absolute or relative values. The tfhd box may include the units of the decoding complexity.

The decoding complexity may be included in a track fragment base media decode time (tfdt) box. The tfdt box may provide the decode time of a sample in the track fragment. The sample in which the decoding time may be included may be the first sample of the track fragment. The tfdt box may be used when performing random access in a file. The decoding complexity for each fragment or sub-sample may be included as shown in the class below.

```
aligned(8) class TrackFragmentBaseMediaDecodeTimeBox
    extends FullBox('tfdt', version, 0) {
    if (version==1) {
        unsigned int(64) baseMediaDecodeTime;
    } else { // version==0
        unsigned int(32) baseMediaDecodeTime;
    }
    unsigned int(8) Absolute;
    unsigned int(32)      minDecodingComplexity;
    unsigned int(32)      maxDecodingComplexity;
    unsigned int(32)      avrDecodingComplexity;
    unsigned int(8)[8] UnitsDecodingComplexity;
}
```

The tfdt box may include a minimum, maximum, and/or average decoding complexity. The decoding complexity in the tfdt box may include absolute or relative values. The relative values may the relative to a prior absolute or relative value. For example, the first decoding complexity in a tfdt box may include an absolute value. Subsequent decoding complexity values may include absolute or relative values. The tfdt box may include the units of the decoding complexity.

The decoding complexity may be included in real-time protocol (RTP) and/or realtime control protocol (RTCP) streaming. For example, if media tracks may be stored in fragmented boxes, the decoding complexity may be included in tfdt and/or tfhd boxes that may be applied to RTP and/or RTCP streaming. Hint tracks may carry transport specific information that may be used by a content providing device to create the RTP and/or RTCP packets.

The decoding complexity may be included in a hint media header (hmhd) box. For example, the decoding complexity may be included for a whole video hint track, which may provide a coarse approach for track selection by the WTRU or other receiving device of the media content. An example of an hmhd box including the decoding complexity is shown below.

```
aligned(8) class HintMediaHeaderBox
    extends FullBox('hmhd', version = 0, 0) {
    unsigned int(16) maxPDUsize;
    unsigned int(16) avgPDUsize;
    unsigned int(32) maxbitrate;
```
```
    unsigned int(32) avgbitrate;
    unsigned int(32) reserved = 0;
    unsigned int(8) Absolute;
    unsigned int(32)      minDecodingComplexity;
    unsigned int(32)      maxDecodingComplexity;
    unsigned int(32)      avrDecodingComplexity;
    unsigned int(8)[8] UnitsDecodingComplexity;
}
```

The hmhd box may include a minimum, maximum, and/or average decoding complexity. The decoding complexity in the hmhd box may include absolute or relative values. The relative values may the relative to a prior absolute or relative value. For example, the first decoding complexity in a hmhd box may include an absolute value. Subsequent decoding complexity values may include absolute or relative values. The hmhd box may include the units of the decoding complexity.

The decoding complexity feedback may be included in quality of experience (QoE) reporting. For example, decoding complexity descriptors may be included within an event reporting service that may be sent from the WTRU. The actual WTRU decoding complexity feedback may be used by the content providing device to attach or update the decoding complexity descriptors. The decoding complexity descriptors may be included within a file format, such as a 3GP file format for example, or within one or more streaming protocols.

The QoE reporting may include DASH QoE reporting. For a DASH client, QoE reporting may be optional. The QoE reporting may use an average throughput metric, an initial playout delay metric, and/or a buffer level metric. TABLE 1 shows an example for including the decoding complexity feedback as a metric in QoE reports.

TABLE 1

Decoding Complexity Feedback

| Key | Type | Description |
| --- | --- | --- |
| DecodingComplexity | Object | Variability of the decoding complexity observed by the client during the measurement interval |
| absolute | Bool | Indicates whether the reported values are absolute or relative metrics |
| avrValue | Integer | The average decoding complexity during the measurement interval |
| minValue | Integer | The minimum decoding complexity during the measurement interval |
| maxValue | Integer | The maximum decoding complexity during the measurement interval |
| T | Real Time | The real-time of the start of the measurement interval |
| duration | Integer | The time of the measurement interval |
| units | String | A value that may denote the units for the reported values |
| deviceSpecs | String | A value that may indicate device characteristics or specifications, such as device type, make, model, release date, OS version, device drivers, player agent, available power, power consumption configurations, and/or the like |

As shown in TABLE 1, the decoding complexity feedback may indicate the decoding complexity for receiving, decoding, and/or displaying media content at a WTRU. The decoding complexity may be in terms of absolute or relative value. The absolute or relative value may be a boolean value that may indicate if the reported values are in absolute or relative metrics (e.g., '1' for absolute and/or '0' for relative). The decoding complexity may include a minimum, maximum, and/or average decoding complexity value measured during a measurement interval. The minimum, maximum, and/or average decoding complexity value may be an integer value, a character value, and/or the like. The decoding complexity feedback may indicate the units for the reported decoding complexity values.

The decoding complexity feedback may indicate a start time and/or a duration of the measurement interval. The start time may include a real time value at which the decoding complexity values were measured. The duration of the measurement interval may include a period of time over which the decoding complexity values were measured. For example, the duration may include an integer value that indicates the time (e.g., in milliseconds, seconds, etc.) over which the measurements were performed.

The decoding complexity feedback may include the device configurations or device specifications that may identify the WTRU at which the measurements are performed. For example, decoding complexity feedback may include the device type, make, model, release date, OS version, device drivers, player agent, available power, power consumption configurations, and/or the like of the WTRU at which the measurements were performed for receiving, decoding, and/or displaying the media content. The decoding complexity feedback may include a unique identifier that indicates the device from which the decoding complexity feedback is being received.

The RTCP protocol may allow or enable WTRUs to send WTRU reports that may be extended to include decoding complexity reports from the WTRUs in an application specific (APP) RTCP type. The RTCP extension may be used by WTRUs to report QoE metrics. An RTCP application type (e.g., FMT=15) may be used to send device specs from WTRUs to content delivery devices during (e.g., at the beginning of) a streaming session.

Figure 8A:
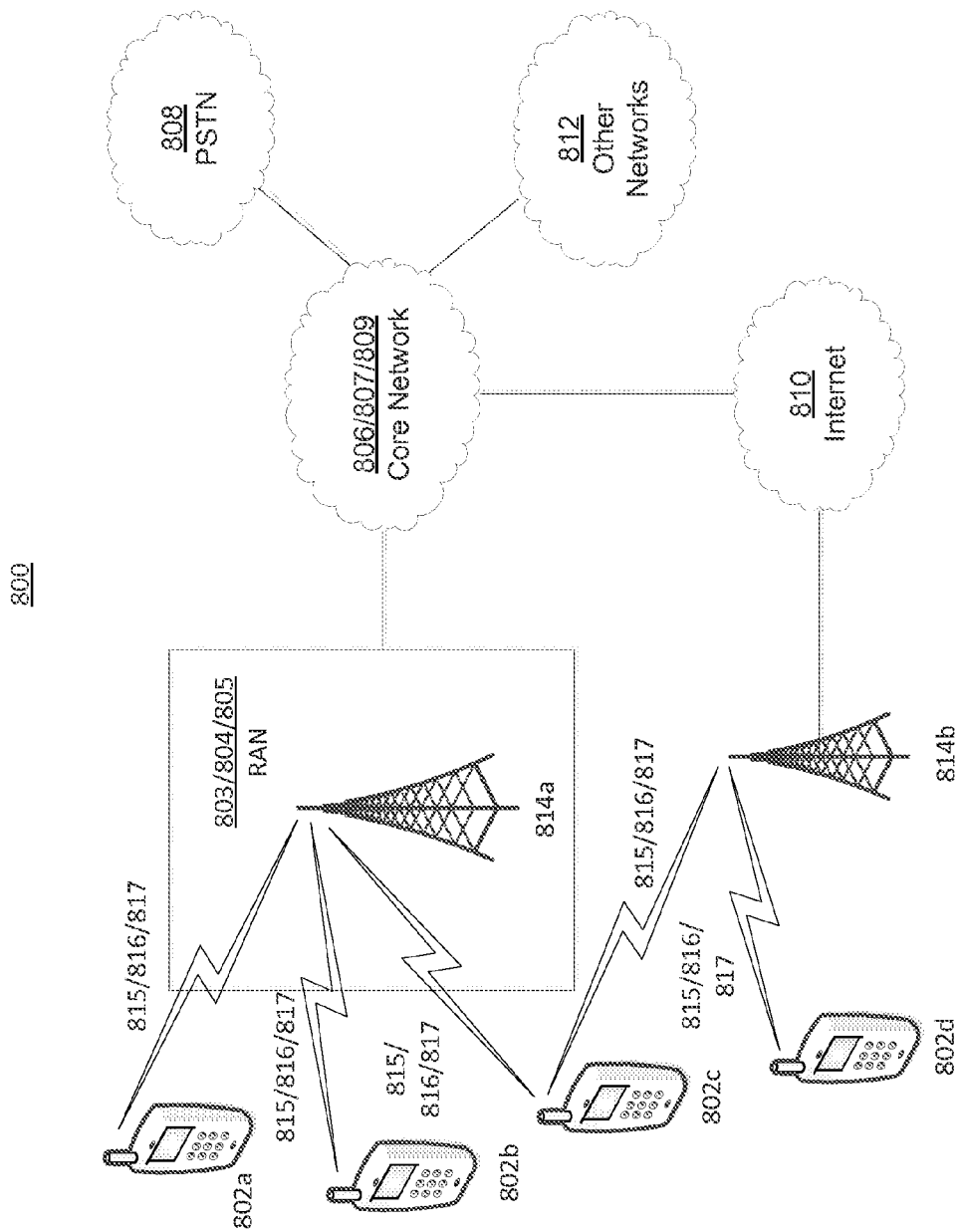
FIG. 8A depicts a system diagram of an example communications system in which one or more disclosed embodiments may be implemented.

FIG. 8A is a diagram that depicts an example communications system 800 in which one or more disclosed embodiments may be implemented. The communications system 800 may be a multiple access system that provides content, such as voice, data, video, messaging, broadcast, etc., to multiple wireless users. The communications system 800 may enable multiple wireless users to access such content through the sharing of system resources, including wireless bandwidth. For example, the communications systems 800 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 8A, the communications system 800 may include wireless transmit/receive units (WTRUs) 802a, 802b, 802c, and/or 802d (which generally or collectively may be referred to as WTRU 802), a radio access network (RAN) 803/804/805, a core network 806/807/809, a public switched telephone network (PSTN) 808, the Internet 810, and other networks 812, though any number of WTRUs, base stations, networks, and/or network elements may be used. Each of the WTRUs 802a, 802b, 802c, and/or 802d may be any type of device configured to operate and/or communicate in a wireless environment. The WTRUs 802a, 802b, 802c, and/or 802d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and/or the like.

The communications systems 800 may also include a base station 814a and/or a base station 814b. Each of the base stations 814a, 814b may be any type of device configured to wirelessly interface with at least one of the WTRUs 802a, 802b, 802c, and/or 802d to facilitate access to one or more communication networks, such as the core network 806/807/809, the Internet 810, and/or the networks 812. The base stations 814a and/or 814b may be a base transceiver station (BTS), a Node-B, an eNode B, a Home Node B, a Home eNode B, a site controller, an access point (AP), a wireless router, and/or the like. While the base stations 814a, 814b are each depicted as a single element, the base stations 814a, 814b may include any number of interconnected base stations and/or network elements.

The base station 814a may be part of the RAN 803/804/805, which may also include other base stations and/or network elements (not shown), such as a base station controller (BSC), a radio network controller (RNC), relay nodes, etc. The base station 814a and/or the base station 814b may be configured to transmit and/or receive wireless signals within a particular geographic region, which may be referred to as a cell (not shown). The cell may further be divided into cell sectors. For example, the cell associated with the base station 814a may be divided into three sectors. Thus, the base station 814a may include three transceivers, e.g., one for each sector of the cell. The base station 814a may employ multiple-input multiple output (MIMO) technology and, therefore, may utilize multiple transceivers for each sector of the cell.

The base stations 814a and/or 814b may communicate with one or more of the WTRUs 802a, 802b, 802c, and/or 802d over an air interface 815/816/817, which may be any suitable wireless communication link (e.g., radio frequency (RF), microwave, infrared (IR), ultraviolet (UV), visible light, etc.). The air interface 815/816/817 may be established using any suitable radio access technology (RAT).

The communications system 800 may be a multiple access system and/or may employ one or more channel access schemes, such as CDMA, TDMA, FDMA, OFDMA, SC-FDMA, and/or the like. For example, the base station 814a in the RAN 803/804/805 and the WTRUs 802a, 802b, and/or 802c may implement a radio technology such as UMTS Terrestrial Radio Access (UTRA), which may establish the air interface 815/816/817 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 814a and the WTRUs 802a, 802b, and/or 802c may implement a radio technology such as E-UTRA, which may establish the air interface 815/816/817 using Long Term Evolution (LTE) and/or LTE-Advanced (LTE-A).

The base station 814a and the WTRUs 802a, 802b, and/or 802c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 814b in FIG. 8A may be a wireless router, Home Node B, Home eNode B, or access point, for example, and may utilize any suitable RAT for facilitating wireless connectivity in a localized area, such as a place of business, a home, a vehicle, a campus, and/or the like. The base station 814b and the WTRUs 802c, 802d may implement a radio technology such as IEEE 802.11 to establish a wireless local area network (WLAN). The base station 814b and the WTRUs 802c, 802d may implement a radio technology such as IEEE 802.15 to establish a wireless personal area network (WPAN). The base station 814b and the WTRUs 802c, 802d may utilize a cellular-based RAT (e.g., WCDMA, CDMA2000. GSM, LTE, LTE-A, etc.) to establish a picocell or femtocell. As shown in FIG. 8A, the base station 814b may have a direct connection to the Internet 810. Thus, the base station 814b may not access the Internet 810 via the core network 806/807/809.

The RAN 803/804/805 may be in communication with the core network 806/807/809, which may be any type of network configured to provide content, such as voice, data, applications, media, and/or voice over internet protocol (VoIP) services to one or more of the WTRUs 802a, 802b, 802c, and/or 802d. For example, the core network 806/807/809 may provide call control, billing services, mobile location-based services, pre-paid calling, Internet connectivity, video distribution, etc., and/or perform high-level security functions, such as user authentication. Although not shown in FIG. 8A, the RAN 803/804/805 and/or the core network 806/807/809 may be in direct or indirect communication with other RANs that employ the same RAT as the RAN 803/804/805 or a different RAT. For example, in addition to being connected to the RAN 803/804/805, which may be utilizing an E-UTRA radio technology, the core network 806/807/809 may also be in communication with another RAN (not shown) employing a GSM radio technology.

The core network 806/807/809 may serve as a gateway for the WTRUs 802a, 802b, 802c, and/or 802d to access the PSTN 808, the Internet 810, and/or other networks 812. The PSTN 808 may include circuit-switched telephone networks that provide plain old telephone service (POTS). The Internet 810 may include a global system of interconnected computer networks and devices that use common communication protocols, such as the transmission control protocol (TCP), user datagram protocol (UDP) and the internet protocol (IP) in the TCP/IP internet protocol suite. The networks 812 may include wired and/or wireless communications networks owned and/or operated by other service providers. For example, the networks 812 may include another core network connected to one or more RANs, which may employ the same RAT as the RAN 803/804/805 or a different RAT.

Some or all of the WTRUs 802a. 802b, 802c, and/or 802d in the communications system 800 may include multi-mode capabilities, e.g., the WTRUs 802a, 802b. 802c, and/or 802d may include multiple transceivers for communicating with different wireless networks over different wireless links. For example, the WTRU 802c shown in FIG. 8A may be configured to communicate with the base station 814a, which may employ a cellular-based radio technology, and with the base station 814b, which may employ an IEEE (e.g., IEEE 802.11) radio technology.

Figure 8B:
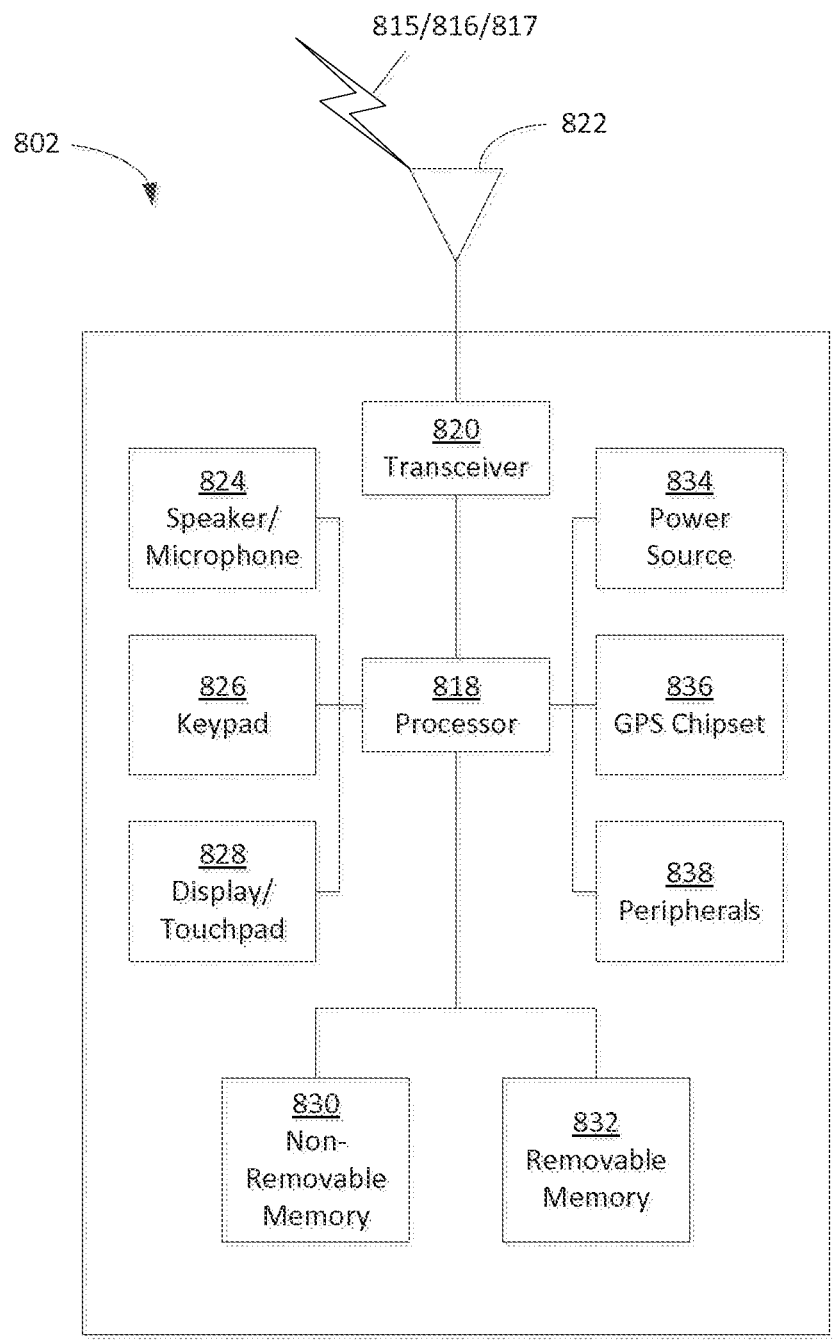
FIG. 8B depicts a system diagram of an example wireless transmit/receive unit (WTRU) that may be used within the communications system illustrated in FIG. 8A.

FIG. 8B depicts a system diagram of an example WTRU 802. As shown in FIG. 8B, the WTRU 802 may include a processor 818, a transceiver 820, a transmit/receive element 822, a speaker/microphone 824, a keypad 826, a display/touchpad 828, non-removable memory 830, removable memory 832, a power source 834, a global positioning system (GPS) chipset 836, and/or other peripherals 838. The WTRU 802 may include any sub-combination of the foregoing elements.

Other devices described herein may include some or all of the elements depicted in FIG. 8B and described herein. For example, the base stations 814a and 814b, and/or the nodes that base stations 814a and 814b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8B and described herein. A content providing device may also include some or all of the elements depicted in FIG. 8B and described herein. For example, the content providing device may use the non-removable memory 830 and/or removable memory 832 to store WTRU identifiers, WTRU configuration information, decoding complexity information, and/or other information described herein.

The processor 818 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 818 may perform signal coding, data processing, power control, input/output processing, and/or any other functionality that enables the WTRU 802 to operate in a wireless environment and/or operate to process video content. The processor 818 may be coupled to the transceiver 820, which may be coupled to the transmit/receive element 822. While FIG. 8B depicts the processor 818 and the transceiver 820 as separate components, the processor 818 and the transceiver 820 may be integrated together in an electronic package or chip.

The transmit/receive element 822 may be configured to transmit signals to, or receive signals from, a base station (e.g., the base station 814a) over the air interface 815/816/817. For example, the transmit/receive element 822 may be an antenna configured to transmit and/or receive RF signals. The transmit/receive element 822 may be an emitter/detector configured to transmit and/or receive IR, UV, and/or visible light signals, for example. The transmit/receive element 822 may be configured to transmit and receive RF and light signals. The transmit/receive element 822 may be configured to transmit and/or receive any combination of wireless signals.

Although the transmit/receive element 822 is depicted in FIG. 8B as a single element, the WTRU 802 may include any number of transmit/receive elements 822. More specifically, the WTRU 802 may employ MIMO technology. Thus, the WTRU 802 may include two or more transmit/receive elements 822 (e.g., multiple antennas) for transmitting and/or receiving wireless signals over the air interface 815/816/817.

The transceiver 820 may be configured to modulate the signals that are to be transmitted by the transmit/receive element 822 and/or to demodulate the signals that are received by the transmit/receive element 822. As noted above, the WTRU 802 may have multi-mode capabilities. Thus, the transceiver 820 may include multiple transceivers for enabling the WTRU 802 to communicate via multiple RATs, such as UTRA and IEEE 802.11, for example.

The processor 818 of the WTRU 802 may be coupled to, and may receive user input data from, the speaker/microphone 824, the keypad 826, and/or the display/touchpad 828

(e.g., a liquid crystal display (LCD) display unit or organic light-emitting diode (OLED) display unit). The processor 818 may output user data to the speaker/microphone 824, the keypad 826, and/or the display/touchpad 828. The processor 818 may access information from, and/or store data in, any type of suitable memory, such as the non-removable memory 830 and/or the removable memory 832. The non-removable memory 830 may include random-access memory (RAM), read-only memory (ROM), a hard disk, or any other type of memory storage device. The removable memory 832 may include a subscriber identity module (SIM) card, a memory stick, a secure digital (SD) memory card, and/or the like. The processor 818 may access information from, and/or store data in, memory that is not physically located on the WTRU 802, such as on a server or a home computer (not shown).

The processor 818 may receive power from the power source 834, and may be configured to distribute and/or control the power to the other components in the WTRU 802. The power source 834 may be any suitable device for powering the WTRU 802. For example, the power source 834 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 818 may also be coupled to the GPS chipset 836, which may be configured to provide location information (e.g., longitude and latitude) regarding the current location of the WTRU 802. In addition to, or in lieu of, the information from the GPS chipset 836, the WTRU 802 may receive location information over the air interface 815/816/817 from a base station (e.g., base stations 814a, 814b) and/or determine its location based on the timing of the signals being received from two or more nearby base stations. The WTRU 802 may acquire location information by way of any suitable location-determination method.

The processor 818 may further be coupled to other peripherals 838, which may include one or more software and/or hardware modules that provide additional features, functionality and/or wired or wireless connectivity. For example, the peripherals 838 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 8C:
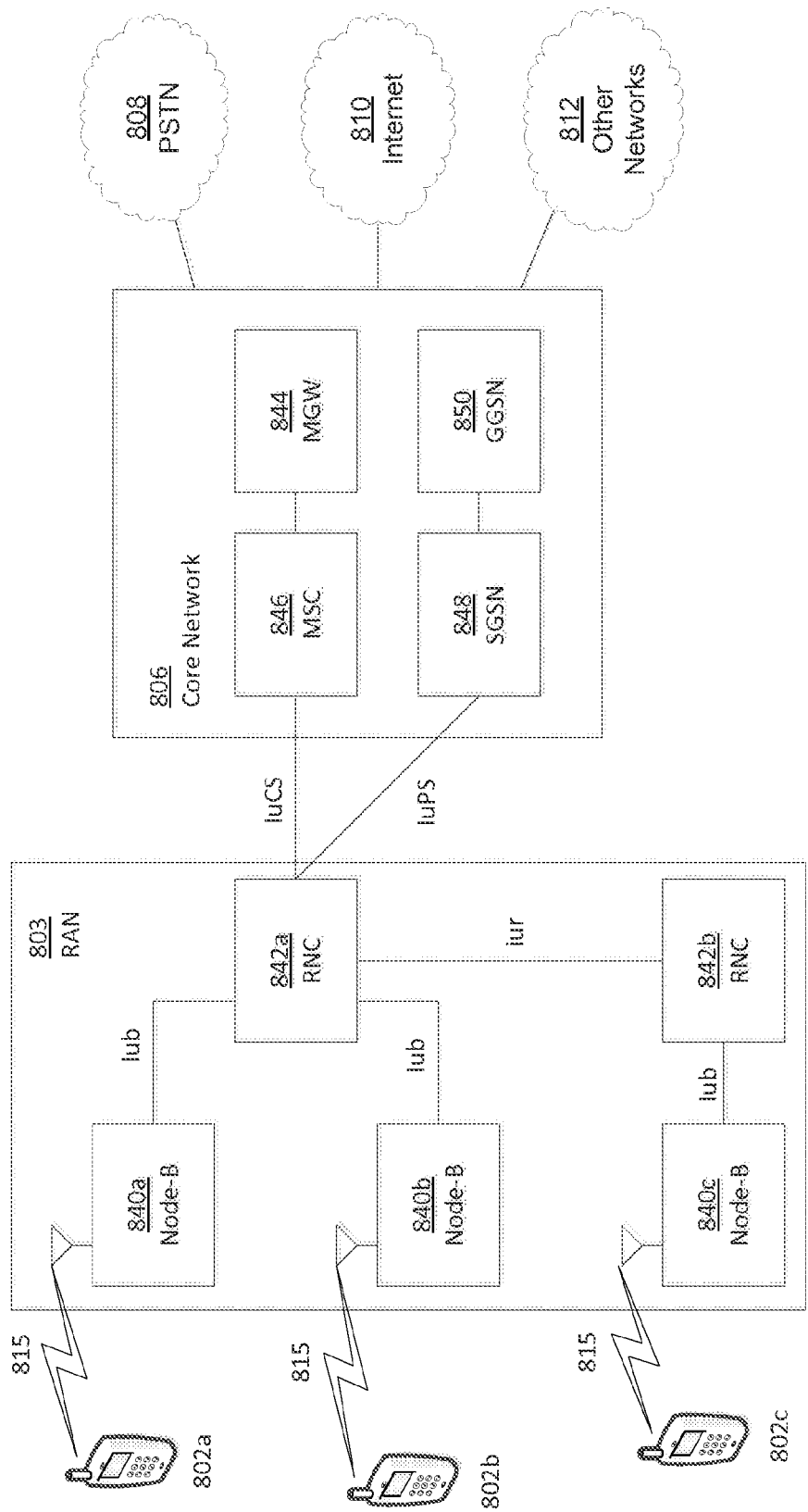
FIG. 8C depicts a system diagram of an example radio access network and an example core network that may be used within the communications system illustrated in FIG. 8A.

FIG. 8C depicts a system diagram of the RAN 803 and the core network 806 according to an embodiment. As noted above, the RAN 803 may employ a UTRA radio technology to communicate with the WTRUs 802a, 802b, and/or 802c over the air interface 815. The RAN 803 may also be in communication with the core network 806. As shown in FIG. 8C, the RAN 803 may include Node-Bs 840a, 840b, and/or 840c, which may each include one or more transceivers for communicating with the WTRUs 802a, 802b, and/or 802c over the air interface 815. The Node-Bs 840a, 840b, and/or 840c may each be associated with a particular cell (not shown) within the RAN 803. The RAN 803 may also include RNCs 842a and/or 842b. The RAN 803 may include any number of Node-Bs and RNCs.

As shown in FIG. 8C, the Node-Bs 840a and/or 840b may be in communication with the RNC 842a. The Node-B 840c may be in communication with the RNC 842b. The Node-Bs 840a, 840b, and/or 840c may communicate with the respective RNCs 842a, 842b via an Iub interface. The RNCs 842a, 842b may be in communication with one another via an Iur interface. Each of the RNCs 842a, 842b may be configured to control the respective Node-Bs 840a, 840b, and/or 840c to which it is connected. Each of the RNCs 842a, 842b may be configured to carry out or support other functionality, such as outer loop power control, load control, admission control, packet scheduling, handover control, macrodiversity, security functions, data encryption, and/or the like.

The core network 806 shown in FIG. 8C may include a media gateway (MGW) 844, a mobile switching center (MSC) 846, a serving GPRS support node (SGSN) 848, and/or a gateway GPRS support node (GGSN) 850. While each of the foregoing elements are depicted as part of the core network 806, any one of these elements may be owned and/or operated by an entity other than the core network operator.

The RNC 842a in the RAN 803 may be connected to the MSC 846 in the core network 806 via an IuCS interface. The MSC 846 may be connected to the MGW 844. The MSC 846 and the MGW 844 may provide the WTRUs 802a, 802b, and/or 802c with access to circuit-switched networks, such as the PSTN 808, to facilitate communications between the WTRUs 802a, 802b, and/or 802c and traditional land-line communications devices.

The RNC 842a in the RAN 803 may be connected to the SGSN 848 in the core network 806 via an IuPS interface. The SGSN 848 may be connected to the GGSN 850. The SGSN 848 and the GGSN 850 may provide the WTRUs 802a. 802b, and/or 802c with access to packet-switched networks, such as the Internet 810, to facilitate communications between and the WTRUs 802a, 802b, and/or 802c and IP-enabled devices.

As noted above, the core network 806 may also be connected to the networks 812, which may include other wired and/or wireless networks that may be owned and/or operated by other service providers.

Figure 8D:
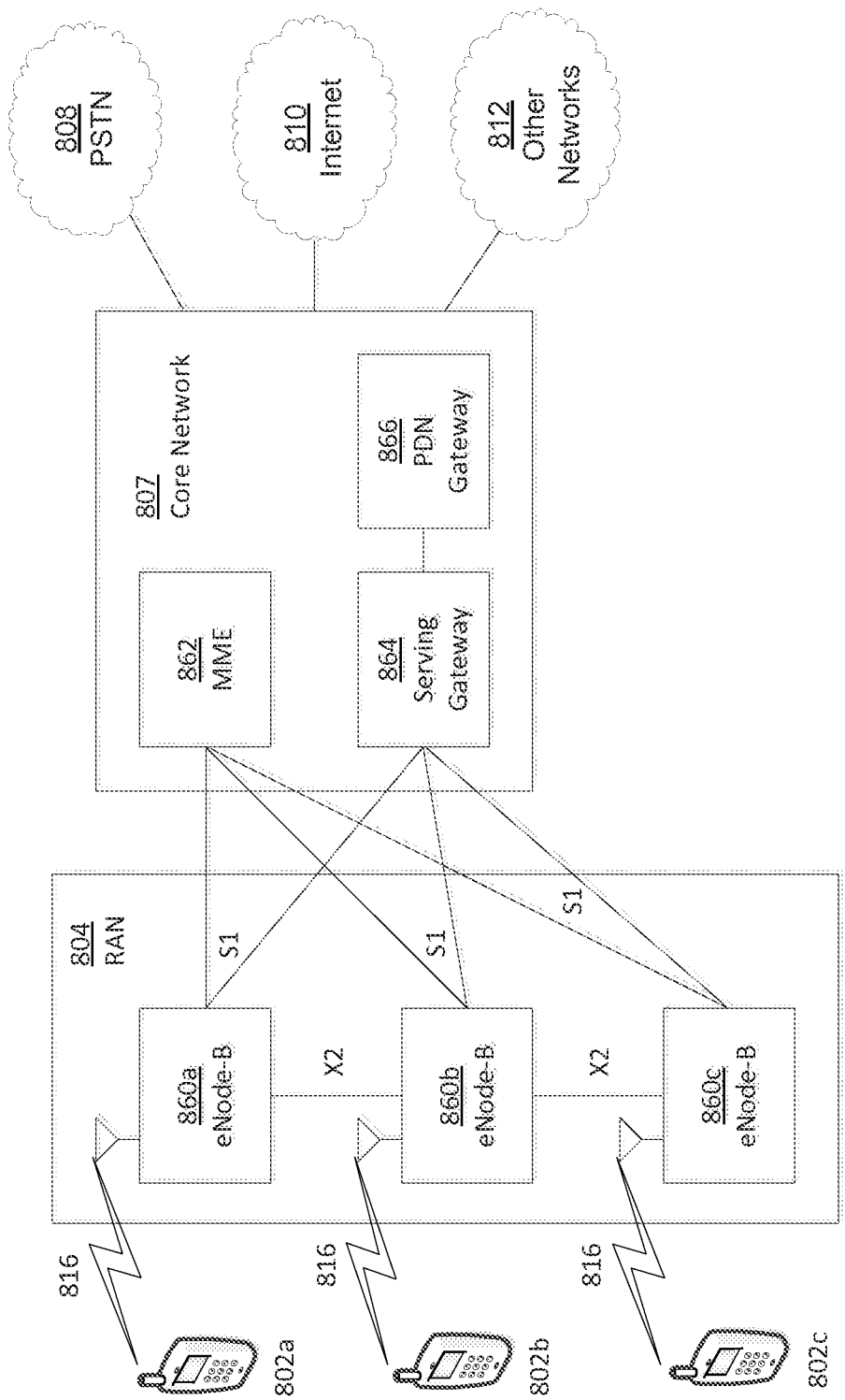
FIG. 8D depicts a system diagram of another example radio access network and another example core network that may be used within the communications system illustrated in FIG. 8A.

FIG. 8D depicts a system diagram of the RAN 804 and the core network 807 according to an embodiment. As noted above, the RAN 804 may employ an E-UTRA radio technology to communicate with the WTRUs 802a, 802b, and/or 802c over the air interface 816. The RAN 804 may also be in communication with the core network 807.

The RAN 804 may include eNode-Bs 860a, 860b, and/or 860c, though the RAN 804 may include any number of eNode-Bs. The eNode-Bs 860a, 860b, and/or 860c may each include one or more transceivers for communicating with the WTRUs 802a, 802b, and/or 802c over the air interface 816. The eNode-Bs 860a, 860b, and/or 860c may implement MIMO technology. Thus, the eNode-B 860a, for example, may use multiple antennas to transmit wireless signals to, and/or receive wireless signals from, the WTRU 802a.

Each of the eNode-Bs 860a, 860b, and/or 860c may be associated with a particular cell (not shown) and may be configured to handle radio resource management decisions, handover decisions, scheduling of users in the uplink and/or downlink, and/or the like. As shown in FIG. 8D, the eNode-Bs 860a, 860b, and/or 860c may communicate with one another over an X2 interface.

The core network 807 shown in FIG. 8D may include a mobility management gateway (MME) 862, a serving gateway 864, and a packet data network (PDN) gateway 866. While each of the foregoing elements are depicted as part of the core network 807, any one of these elements may be owned and/or operated by an entity other than the core network operator.

The MME 862 may be connected to each of the eNode-Bs 860a, 860b, and/or 860c in the RAN 804 via an S1 interface and may serve as a control node. For example, the MME 862 may be responsible for authenticating users of the WTRUs 802a, 802b, and/or 802c, bearer activation/deactivation, selecting a particular serving gateway during an initial attach of the WTRUs 802a, 802b, and/or 802c, and/or the like. The MME 862 may provide a control plane function for switching between the RAN 804 and other RANs (not shown) that may employ other radio technologies, such as GSM or WCDMA.

The serving gateway 864 may be connected to each of the eNode-Bs 860a, 860b, and/or 860c in the RAN 804 via the SI interface. The serving gateway 864 may generally route and/or forward user data packets to/from the WTRUs 802a, 802b, and/or 802c. The serving gateway 864 may perform other functions, such as anchoring user planes during inter-eNode B handovers, triggering paging when downlink data is available for the WTRUs 802a, 802b, and/or 802c, managing and storing contexts of the WTRUs 802a, 802b, and/or 802c, and/or the like.

The serving gateway 864 may be connected to the PDN gateway 866, which may provide the WTRUs 802a, 802b, and/or 802c with access to packet-switched networks, such as the Internet 810, to facilitate communications between the WTRUs 802a, 802b, and/or 802c and IP-enabled devices.

The core network 807 may facilitate communications with other networks. For example, the core network 807 may provide the WTRUs 802a, 802b, and/or 802c with access to circuit-switched networks, such as the PSTN 808, to facilitate communications between the WTRUs 802a, 802b, and/or 802c and traditional land-line communications devices. For example, the core network 807 may include, or may communicate with, an IP gateway (e.g., an IP multimedia subsystem (IMS) server) that serves as an interface between the core network 807 and the PSTN 808. The core network 807 may provide the WTRUs 802a. 802b, and/or 802c with access to the networks 812, which may include other wired and/or wireless networks that may be owned and/or operated by other service providers.

Figure 8E:
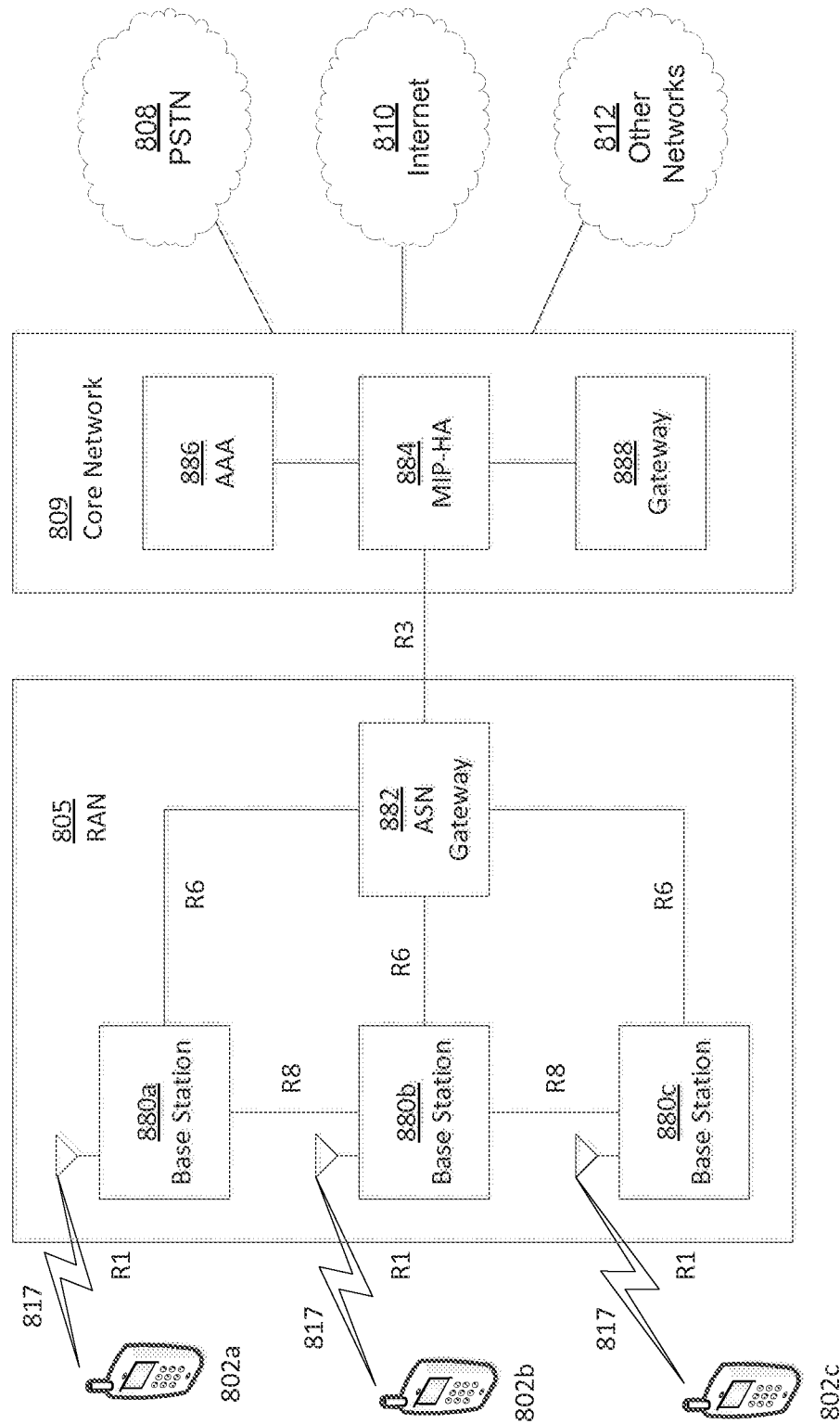
FIG. 8E depicts a system diagram of another example radio access network and another example core network that may be used within the communications system illustrated in FIG. 8A.

FIG. 8E depicts a system diagram of the RAN 805 and the core network 809. The RAN 805 may be an access service network (ASN) that employs IEEE 802.16 radio technology to communicate with the WTRUs 802a, 802b, and/or 802c over the air interface 817. As will be further described herein, the communication links between the different functional entities of the WTRUs 802a, 802b, and/or 802c, the RAN 805, and the core network 809 may be defined as reference points.

As shown in FIG. 8E, the RAN 805 may include base stations 880a, 880b, and/or 880c, and an ASN gateway 882, though the RAN 805 may include any number of base stations and/or ASN gateways. The base stations 880a, 880b, and/or 880c may each be associated with a particular cell (not shown) in the RAN 805 and/or may each include one or more transceivers for communicating with the WTRUs 802a, 802b, and/or 802c over the air interface 817. The base stations 880a, 880b, and/or 880c may implement MIMO technology. Thus, the base station 880a, for example, may use multiple antennas to transmit wireless signals to, and/or receive wireless signals from, the WTRU 802a. The base stations 880a, 880b, and/or 880c may provide mobility management functions, such as handoff triggering, tunnel establishment, radio resource management, traffic classification, quality of service (QoS) policy enforcement, and/or the like. The ASN gateway 882 may serve as a traffic aggregation point and may be responsible for paging, caching of subscriber profiles, routing to the core network 809, and/or the like.

The air interface 817 between the WTRUs 802a, 802b, and/or 802c and the RAN 805 may be defined as an R1 reference point that implements the IEEE 802.16 specification. Each of the WTRUs 802a, 802b, and/or 802c may establish a logical interface (not shown) with the core network 809. The logical interface between the WTRUs 802a, 802b, and/or 802c and the core network 809 may be defined as an R2 reference point, which may be used for authentication, authorization, IP host configuration management, and/or mobility management.

The communication link between each of the base stations 880a, 880b, and/or 880c may be defined as an R8 reference point that includes protocols for facilitating WTRU handovers and/or the transfer of data between base stations. The communication link between the base stations 880a, 880b, and/or 880c and the ASN gateway 882 may be defined as an R6 reference point. The R6 reference point may include protocols for facilitating mobility management based on mobility events associated with each of the WTRUs 802a, 802b, and/or 802c.

As shown in FIG. 8E, the RAN 805 may be connected to the core network 809. The communication link between the RAN 805 and the core network 809 may defined as an R3 reference point that may include protocols for facilitating data transfer and mobility management capabilities, for example. The core network 809 may include a mobile IP home agent (MIP-HA) 884, an authentication, authorization, accounting (AAA) server 886, and/or a gateway 888. While each of the foregoing elements are depicted as part of the core network 809, any one of these elements may be owned and/or operated by an entity other than the core network operator.

The MIP-HA 884 may be responsible for IP address management, and may enable the WTRUs 802a, 802b, and/or 802c to roam between different ASNs and/or different core networks. The MIP-HA 884 may provide the WTRUs 802a, 802b, and/or 802c with access to packet-switched networks, such as the Internet 810, to facilitate communications between the WTRUs 802a, 802b, and/or 802c and IP-enabled devices. The AAA server 886 may be responsible for user authentication and for supporting user services. The gateway 888 may facilitate interworking with other networks. For example, the gateway 888 may provide the WTRUs 802a, 802b, and/or 802c with access to circuit-switched networks, such as the PSTN 808, to facilitate communications between the WTRUs 802a, 802b, and/or 802c and traditional land-line communications devices. The gateway 888 may provide the WTRUs 802a, 802b, and/or 802c with access to the networks 812, which may include other wired and/or wireless networks that may be owned and/or operated by other service providers.

Although not shown in FIG. 8E, the RAN 805 may be connected to other ASNs and/or the core network 809 may be connected to other core networks. The communication link between the RAN 805 the other ASNs may be defined as an R4 reference point, which may include protocols for coordinating the mobility of the WTRUs 802a, 802b, and/or 802c between the RAN 805 and the other ASNs. The communication link between the core network 809 and the other core networks may be defined as an R5 reference, which may include protocols for facilitating interworking between home core networks and visited core networks.

Although features and elements are described above in particular combinations, each feature or element may be used alone or in any combination with the other features and/or elements. The methods described herein may be implemented in a computer program, software, or firmware incorporated in a computer-readable medium for execution by a computer or processor. Examples of computer-readable media include electronic signals (transmitted over wired or wireless connections) and/or computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and/or optical media such as CD-ROM disks, and digital versatile disks (DVDs). A processor in association with software may be used to implement a radio frequency transceiver for use in a WTRU, UE, terminal, base station, RNC, content providing device, and/or any host computer.

What is claimed:

1. A method for determining a decoding complexity associated with media content, the method comprising:
   receiving decoding complexity feedback from a plurality of reference wireless transmit/receive units (WTRUs), wherein the decoding complexity feedback received from each reference WTRU of the plurality of reference WTRUs is based on at least one of an amount of power, an amount of time, or an amount of computing resources associated with decoding or displaying the media content at the reference WTRU;
   receiving a request for the media content;
   determining a decoding complexity associated with the media content, wherein the decoding complexity is based on the decoding complexity feedback received from the plurality of reference WTRUs;
   inserting the decoding complexity that is determined based on the decoding complexity feedback received from the plurality of reference WTRUs into a media presentation descriptor (MPD) file associated with the media content; and
   sending the MPD file that comprises the determined decoding complexity to a WTRU.

2. The method of claim 1, wherein the media content comprises a plurality of different types of media content, and wherein the decoding complexity includes a corresponding decoding complexity for each of the plurality of different types of media content.

3. The method of claim 2, further comprising sending, to the WTRU, an indication of each of the plurality of different types of media content and the corresponding decoding complexity for the each of the plurality of different types of media content.

4. The method of claim 3, further comprising:
   receiving a selection of at least one of the plurality of different types of media content from the WTRU; and
   sending the selected at least one of the plurality of different types of media content to the WTRU.

5. The method of claim 2, further comprising determining, based on the corresponding decoding complexity for the each of the plurality of different types of media content, at least one of the plurality of different types of media content for being transmitted to the WTRU.

6. The method of claim 1, wherein the media content comprises a plurality of segments, wherein each segment of the plurality of segments has a corresponding decoding complexity.

7. The method of claim 1, wherein the decoding complexity feedback received from each reference WTRU of the plurality of reference WTRUs indicates measurements taken at the reference WTRU from which the decoding complexity feedback is received.

8. The method of claim 1, wherein the decoding complexity indicates at least one of a maximum amount of power, a minimum amount of power, or an average amount of power used to decode or display the media content.

9. The method of claim 1, further comprising including an indication of the decoding complexity in a streaming protocol or file associated with the media content.

10. The method of claim 1, wherein the decoding complexity is included in at least one of a dynamic adaptive streaming over HTTP (DASH) protocol, a session description protocol (SDP), or a 3GP file.

11. A content providing device for determining a decoding complexity associated with media content, the content providing device comprising:
    a processor configured to:
       receive decoding complexity feedback from a plurality of reference wireless transmit/receive units (WTRUs), wherein the decoding complexity feedback received from each reference WTRU of the plurality of reference WTRUs is based on at least one of an amount of power, an amount of time, or an amount of computing resources associated with decoding or displaying the media content at the reference WTRU;
       receive a request for the media content;
       determine a decoding complexity associated with the media content, wherein the decoding complexity is based on the decoding complexity feedback received from the plurality of reference WTRUs;
       insert the decoding complexity that is determined based on the decoding complexity feedback received from the plurality of reference WTRUs into a media presentation descriptor (MPD) file associated with the media content; and
       send the MPD file that comprises the determined decoding complexity to a WTRU.

12. The content providing device of claim 11, wherein the media content comprises a plurality of different types of media content, and wherein the decoding complexity includes a corresponding decoding complexity for each of the plurality of different types of media content.

13. The content providing device of claim 12, wherein the processor is further configured to send, to the WTRU, an indication of each of the plurality of different types of media content and the corresponding decoding complexity for the each of the plurality of different types of media content.

14. The content providing device of claim 13, wherein the processor is further configured to:
    receive a selection of at least one of the plurality of different types of media content from the WTRU; and
    send the selected at least one of the plurality of different types of media content to the WTRU.

15. The content providing device of claim 12, wherein the processor is further configured to determine, based on the corresponding decoding complexity for the each of the plurality of different types of media content, at least one of the plurality of different types of media content for being transmitted to the WTRU.

16. The content providing device of claim 11, wherein the media content comprises a plurality of segments, wherein each segment of the plurality of segments has a corresponding decoding complexity.

17. The content providing device of claim 11, wherein the decoding complexity feedback received from each reference WTRU of the plurality of reference WTRUs indicates measurements taken at the reference WTRU from which the decoding complexity feedback is received.

18. The content providing device of claim 11, wherein the decoding complexity indicates at least one of a maximum amount of power, a minimum amount of power, or an average amount of power used to decode or display the media content.

19. The content providing device of claim 11, wherein the processor is further configured to include an indication of the decoding complexity in a streaming protocol or file associated with the media content.

20. The content providing device of claim 11, wherein the decoding complexity is included in at least one of a dynamic adaptive streaming over HTTP (DASH) protocol, a session description protocol (SDP), or a 3GP file.

* * * * *